(12) United States Patent
Vendrow et al.

(10) Patent No.: US 9,350,845 B2
(45) Date of Patent: May 24, 2016

(54) UNIVERSAL CALL MANAGEMENT PLATFORM

(75) Inventors: Vlad Vendrow, Redwood Shores, CA (US); Vi Chau, San Francisco, CA (US); Praful Shah, Los Alto Hills, CA (US); Vladimir Shmunis, South Lake Tahoe, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 12/958,181

(22) Filed: Dec. 1, 2010

(65) Prior Publication Data

US 2011/0130168 A1 Jun. 2, 2011

Related U.S. Application Data

(60) Provisional application No. 61/265,747, filed on Dec. 1, 2009.

(51) Int. Cl.
*H04M 1/00* (2006.01)
*H04M 1/57* (2006.01)
(Continued)

(52) U.S. Cl.
CPC ............ *H04M 1/57* (2013.01); *H04M 1/663* (2013.01); *H04M 1/72563* (2013.01); *H04M 1/64* (2013.01); *H04M 1/72552* (2013.01)

(58) Field of Classification Search
CPC .......... H04M 3/42314; H04M 3/4234; H04M 7/009; H04M 1/57; H04M 1/663; H04M 1/72563; H04M 1/64; H04M 1/72552; H04L 63/08; H04Q 2213/1322; H04Q 2213/13384
USPC ............. 455/410, 411, 413, 414.1, 417, 419, 455/456.1, 556.1; 370/201.01, 259, 370/352–354, 356, 359, 397, 409, 410, 422, 370/427, 475; 379/154, 196, 114.01, 379/201.01, 201.03, 201.04, 201.06, 379/201.12, 20, 2.01, 207.02, 211.01, 379/211.02, 265.02

See application file for complete search history.

(56) References Cited

U.S. PATENT DOCUMENTS 5,841,854 A 11/1998 Schumacher et al.
6,249,576 B1 6/2001 Sassin et al.
(Continued)

FOREIGN PATENT DOCUMENTS

EP 1 087 600 3/2001
EP 1 383 299 1/2004
(Continued)

OTHER PUBLICATIONS

Korean Authorized Officer Wooncheol Hwang, Notification of Transmittal of the International Search Report and the Written Opinion of the International Searching Authority, or the Declaration for Application No. PCT/US2010/058569, dated Aug. 18, 2011, 8 pages.
(Continued)

*Primary Examiner* — Mahendra Patel
(74) *Attorney, Agent, or Firm* — Fish & Richardson P.C.

(57) ABSTRACT

Systems, methods and computer program products for enabling integration between various internet- or non-internet based communication services (e.g., as provided by different communications platforms and service providers) using a universal platform are described. In some implementations, a service manager is provided that can integrate call management capabilities with multiple communications platforms using the universal platform to enable seamless communication between the various platforms. For example, interactions between individual users on one or more platforms can be tracked in a single conversation history as a threaded interface. The universal platform can integrate with various platforms and third party protocols and services to provide call features that include, for example, call forwarding, call handling, multiple greeting prompts, call screening rules, ring-out rules, international calling, caller ID rules, after hours, and announcement prompts.

23 Claims, 16 Drawing Sheets

(51) Int. Cl.
*H04M 1/663* (2006.01)
*H04M 1/64* (2006.01)
*H04M 1/725* (2006.01)

(56) References Cited

U.S. PATENT DOCUMENTS

| | | | |
|---|---|---|---|
| 6,393,017 B1 | 5/2002 | Galvin et al. | |
| 6,445,920 B1 | 9/2002 | Pfundstein | |
| 6,587,555 B1* | 7/2003 | Cripe et al. | 379/211.02 |
| 6,775,272 B2* | 8/2004 | Galvin et al. | 370/352 |
| 7,006,614 B2* | 2/2006 | Feinberg et al. | 379/164 |
| 7,031,437 B1* | 4/2006 | Parsons et al. | 379/88.12 |
| 7,099,445 B2* | 8/2006 | Creamer et al. | 379/142.06 |
| 7,123,608 B1 | 10/2006 | Scott et al. | |
| 7,248,577 B2* | 7/2007 | Hakusui | 370/352 |
| 7,254,643 B1 | 8/2007 | Peters et al. | 709/246 |
| 7,313,106 B2* | 12/2007 | Steinberg | 370/328 |
| 7,440,561 B2 | 10/2008 | Forte | |
| 7,454,195 B2 | 11/2008 | Lewis et al. | |
| 7,496,091 B2* | 2/2009 | Galvin et al. | 370/356 |
| 7,518,984 B2 | 4/2009 | Koyama | |
| 7,542,780 B2 | 6/2009 | Höglander et al. | |
| 7,567,662 B1* | 7/2009 | Renner et al. | 379/202.01 |
| 7,602,895 B2* | 10/2009 | Terry et al. | 379/215.01 |
| 7,603,379 B2 | 10/2009 | Kang et al. | |
| 7,640,293 B2* | 12/2009 | Wilson et al. | 709/203 |
| 7,746,848 B2* | 6/2010 | Hakusui | 370/352 |
| 7,756,255 B1 | 7/2010 | Santharam et al. | |
| 7,885,399 B2* | 2/2011 | Abramson et al. | 379/225 |
| 7,940,702 B1 | 5/2011 | Donley et al. | |
| 7,958,099 B2 | 6/2011 | Kang et al. | |
| 7,966,385 B2 | 6/2011 | Netravali et al. | |
| 7,974,618 B2 | 7/2011 | Silver | |
| 7,996,473 B2 | 8/2011 | Braam | |
| 8,001,181 B2* | 8/2011 | Wilson et al. | 709/203 |
| 8,130,931 B2* | 3/2012 | Murphy et al. | 379/215.01 |
| 8,838,169 B2 | 9/2014 | Vendrow et al. | |
| 2002/0099633 A1* | 7/2002 | Bray | G06F 17/211 705/35 |
| 2002/0114329 A1 | 8/2002 | Galvin et al. | |
| 2003/0041152 A1 | 2/2003 | Schmeltzle et al. | |
| 2003/0069939 A1* | 4/2003 | Russell | G06F 15/167 709/214 |
| 2004/0028201 A1 | 2/2004 | Huttel et al. | |
| 2004/0160951 A1* | 8/2004 | Galvin | H04M 3/00 370/352 |
| 2004/0202153 A1 | 10/2004 | Koyama | |
| 2004/0243705 A1 | 12/2004 | Netravali et al. | |
| 2005/0048967 A1 | 3/2005 | Höglander et al. | |
| 2005/0165719 A1 | 7/2005 | Greenspan et al. | |
| 2006/0023657 A1* | 2/2006 | Woodson et al. | 370/328 |
| 2006/0030357 A1* | 2/2006 | McConnell et al. | 455/554.1 |
| 2006/0053227 A1* | 3/2006 | Ye et al. | 709/230 |
| 2006/0116127 A1* | 6/2006 | Wilhoite et al. | 455/442 |
| 2006/0205436 A1* | 9/2006 | Liu et al. | 455/560 |
| 2006/0229054 A1 | 10/2006 | Erola et al. | |
| 2007/0019623 A1 | 1/2007 | Alt et al. | |
| 2007/0047534 A1 | 3/2007 | Hakusui | |
| 2007/0094583 A1* | 4/2007 | Randall | H04N 21/440218 715/234 |
| 2007/0111716 A1* | 5/2007 | Leigh et al. | 455/417 |
| 2007/0123239 A1* | 5/2007 | Leigh et al. | 455/416 |
| 2007/0153770 A1 | 7/2007 | Goyal et al. | |
| 2007/0206573 A1 | 9/2007 | Silver | |
| 2008/0034060 A1 | 2/2008 | Fisher, Jr. | |
| 2008/0091454 A1 | 4/2008 | Fisher, Jr. | |
| 2008/0130554 A1* | 6/2008 | Gisby et al. | 370/328 |
| 2008/0172574 A1 | 7/2008 | Fisher | |
| 2008/0186929 A1* | 8/2008 | Rice et al. | 370/338 |
| 2009/0029724 A1* | 1/2009 | Hardy et al. | 455/466 |
| 2009/0054032 A1 | 2/2009 | Ren et al. | |
| 2009/0059818 A1* | 3/2009 | Pickett | 370/259 |
| 2010/0002626 A1* | 1/2010 | Schmidt et al. | 370/328 |
| 2010/0046731 A1* | 2/2010 | Gisby et al. | 379/211.01 |
| 2010/0056109 A1* | 3/2010 | Wilson et al. | 455/412.1 |
| 2010/0080214 A1* | 4/2010 | Li et al. | 370/352 |
| 2010/0220714 A1* | 9/2010 | Clark et al. | 370/352 |
| 2010/0246575 A1 | 9/2010 | Hakusui | |
| 2010/0299719 A1 | 11/2010 | Burks et al. | |
| 2011/0134804 A1 | 6/2011 | Maes | |
| 2011/0153668 A1* | 6/2011 | Walker et al. | 707/781 |
| 2011/0177797 A1* | 7/2011 | Vendrow et al. | 455/414.1 |
| 2013/0144951 A1* | 6/2013 | Viswanath | H04L 29/08 709/204 |
| 2014/0040445 A1* | 2/2014 | Beckert | H04L 67/2823 709/223 |
| 2014/0342711 A1 | 11/2014 | Vendrow et al. | |
| 2015/0133113 A1 | 5/2015 | Vendrow et al. | |

FOREIGN PATENT DOCUMENTS

| | | |
|---|---|---|
| EP | 1 494 429 | 1/2005 |
| EP | 1 608 190 | 12/2005 |
| KR | 10-2006-0115833 A | 11/2006 |
| WO | WO 00/79826 | 12/2000 |
| WO | WO 2007/025950 A1 | 3/2007 |
| WO | WO 2008/074122 A1 | 6/2008 |

OTHER PUBLICATIONS

European Search Report in EP 10 84 4113, mailed Jul. 23, 2013, 3 pages.
Communication pursuant to Article 94(3) EPC, in EP 10 84 4113, mailed Aug. 2, 2013, 6 pages.
Authorized officer Yeomin Yoon, International Search Report and Written Opinion in PCT/US2010/022075, mailed Feb. 28, 2011, 10 pages.
Authorized officer Simin Baharlou, International Preliminary Report on Patentability in PCT/US2010/058569, mailed Jun. 5, 2012, 5 pages.
Authorized officer Simin Baharlou, International Preliminary Report on Patentability in PCT/US2010/022075, mailed Aug. 2, 2012, 7 pages.

\* cited by examiner

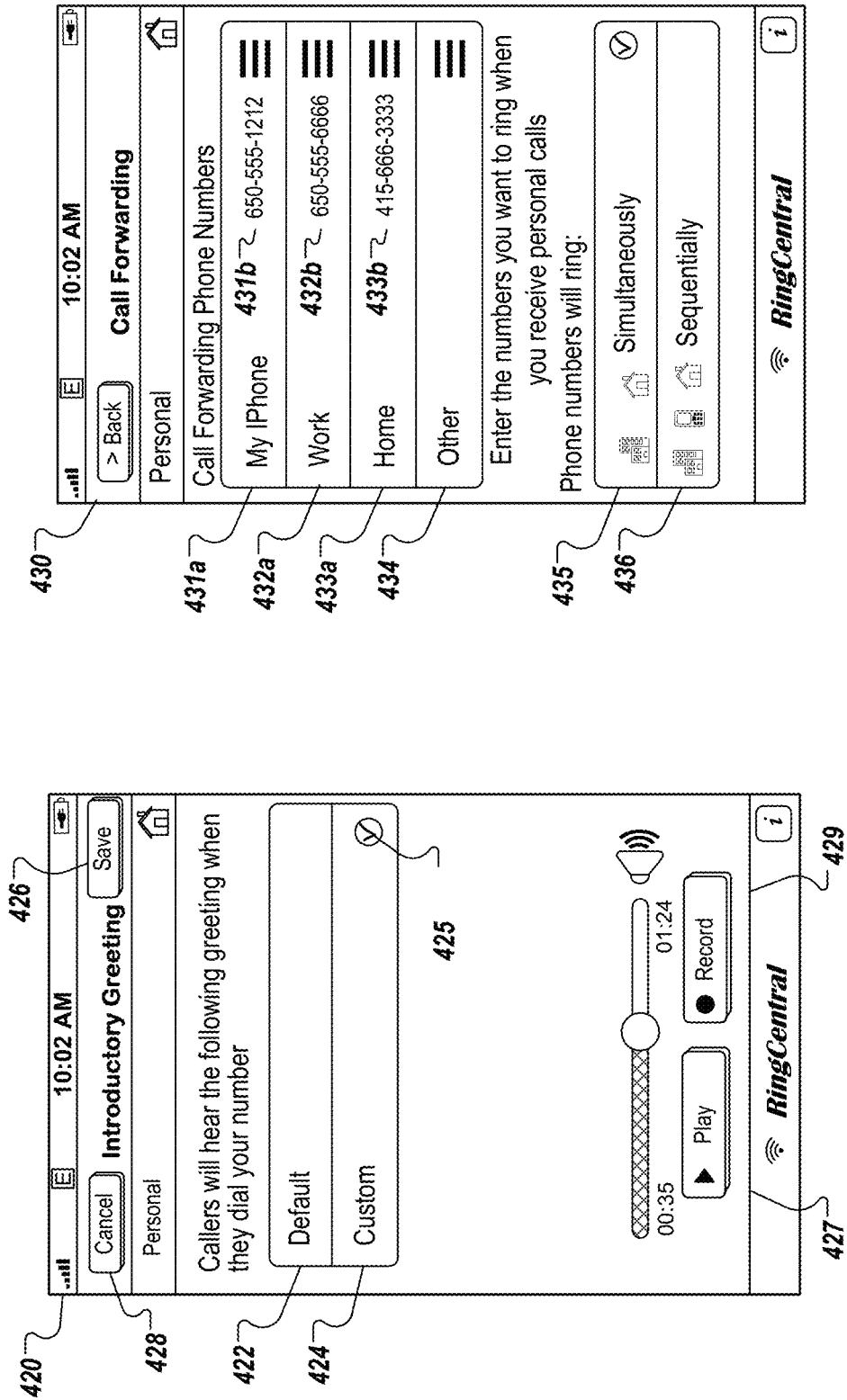

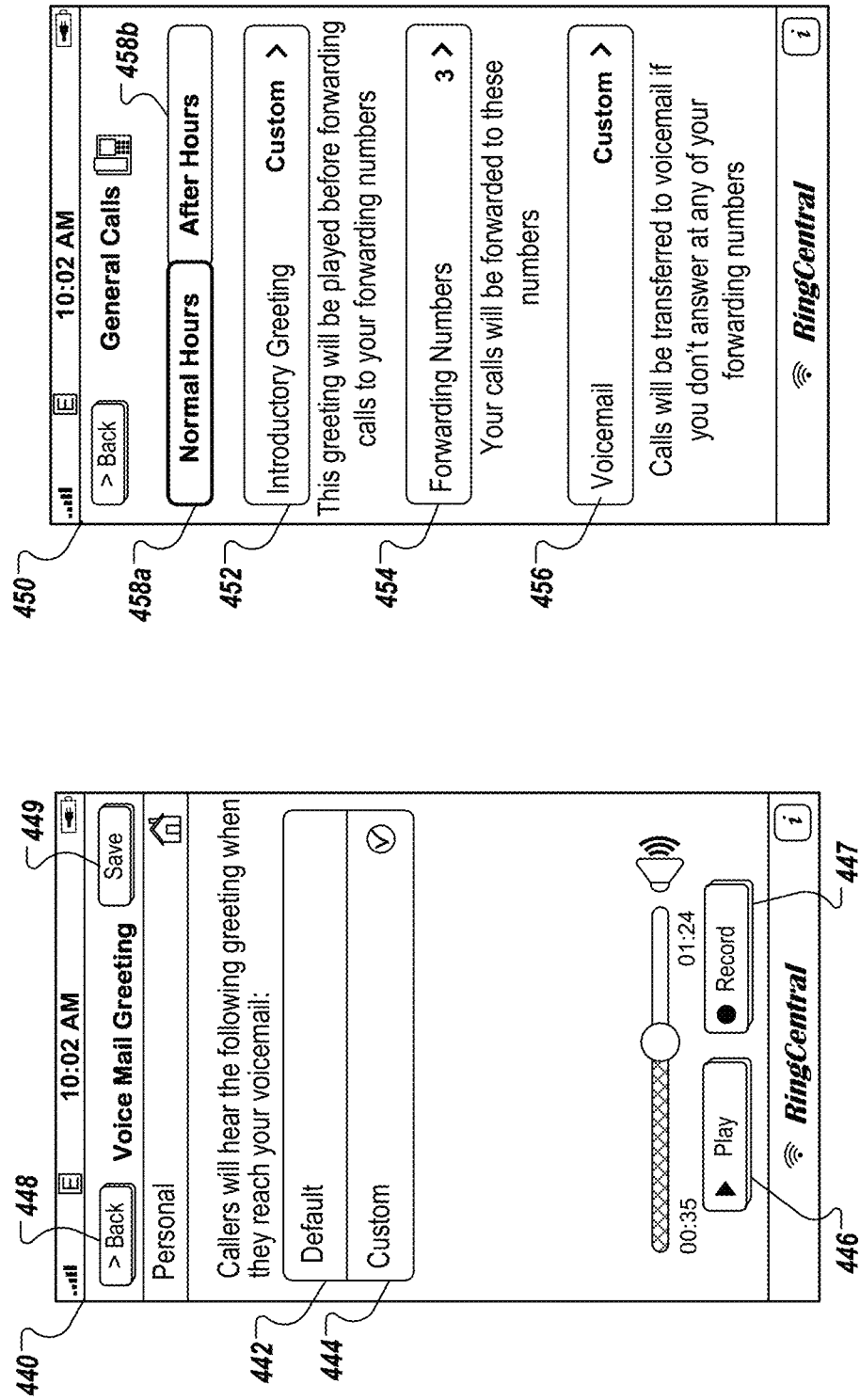

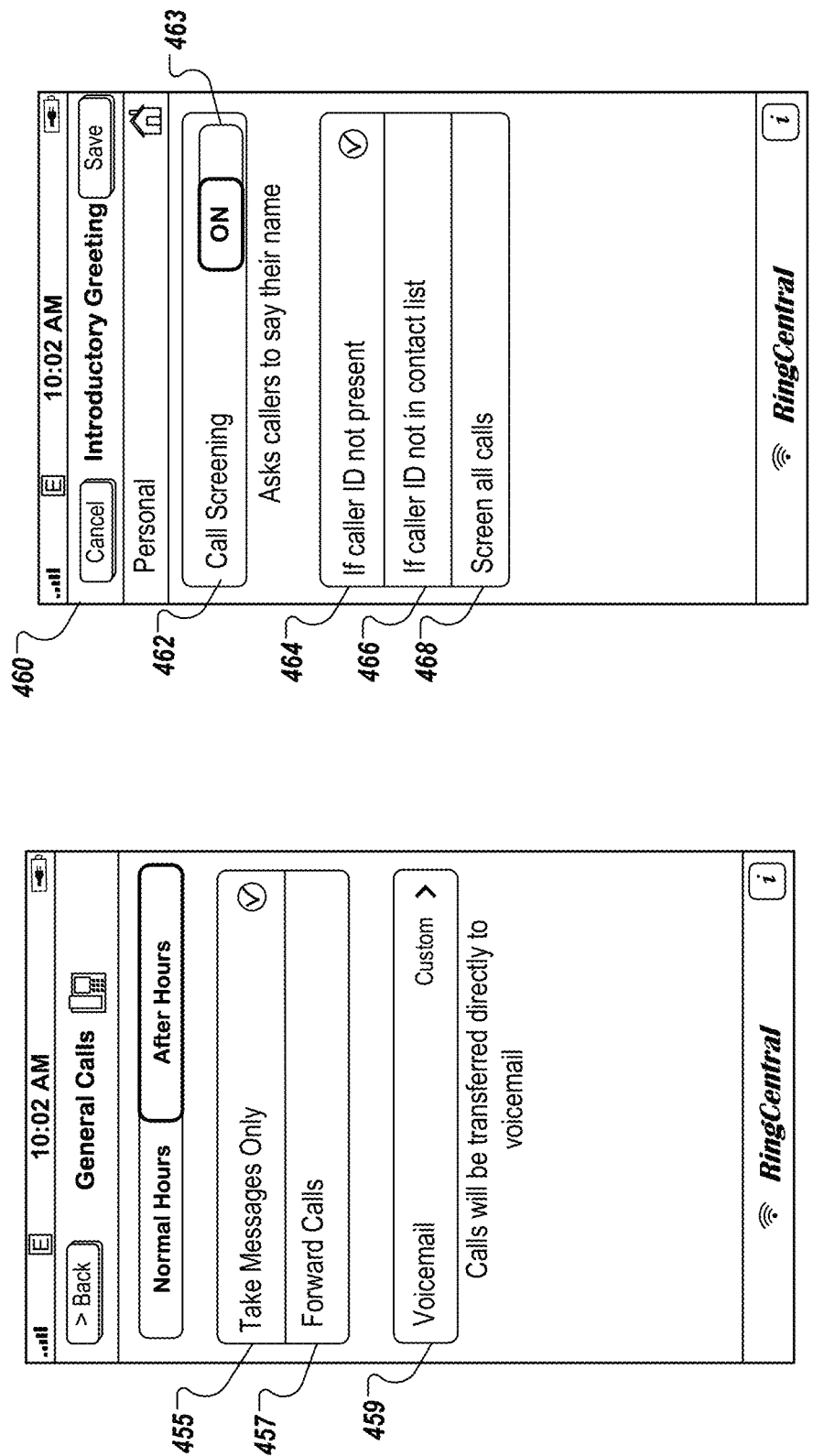

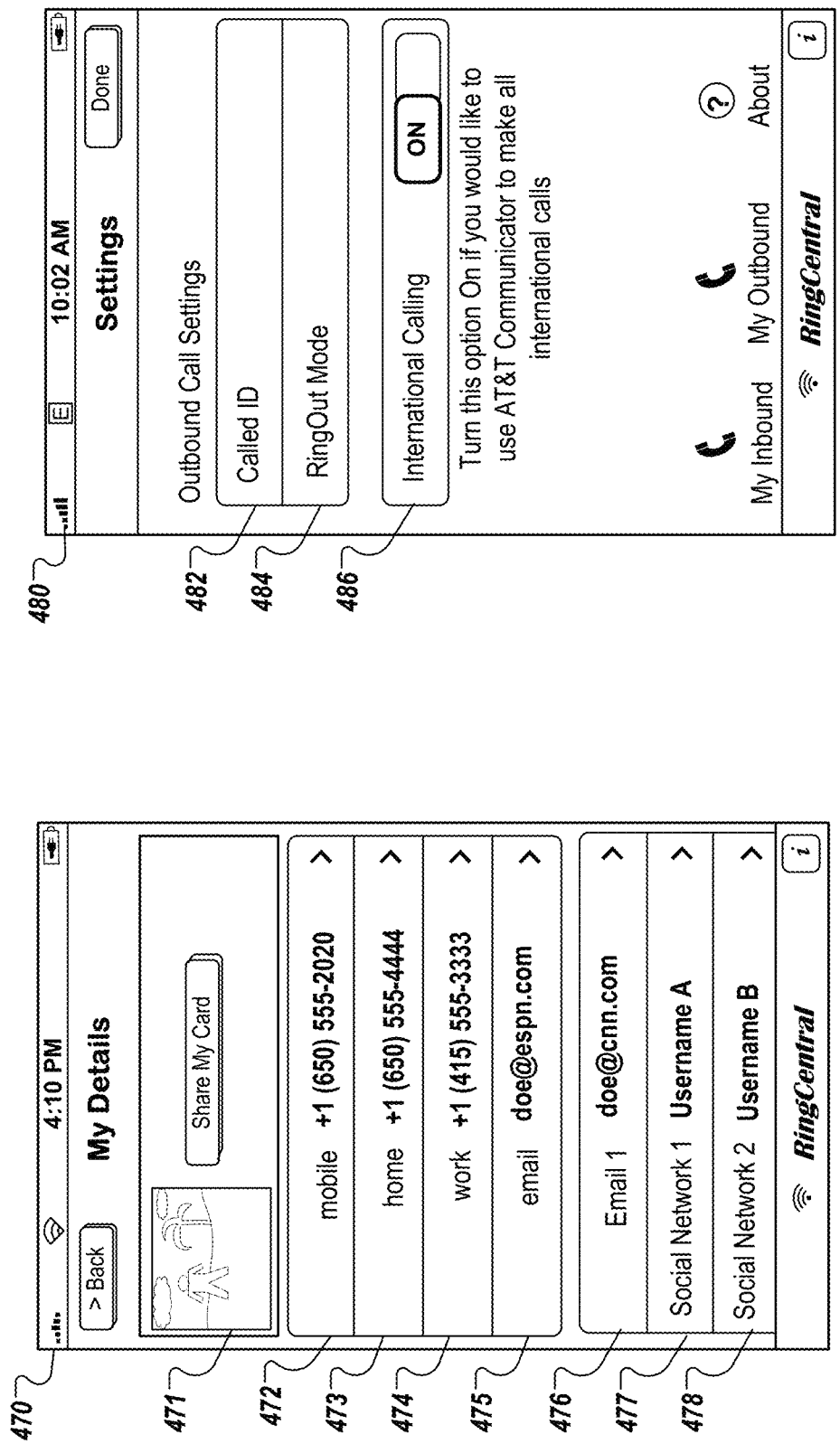

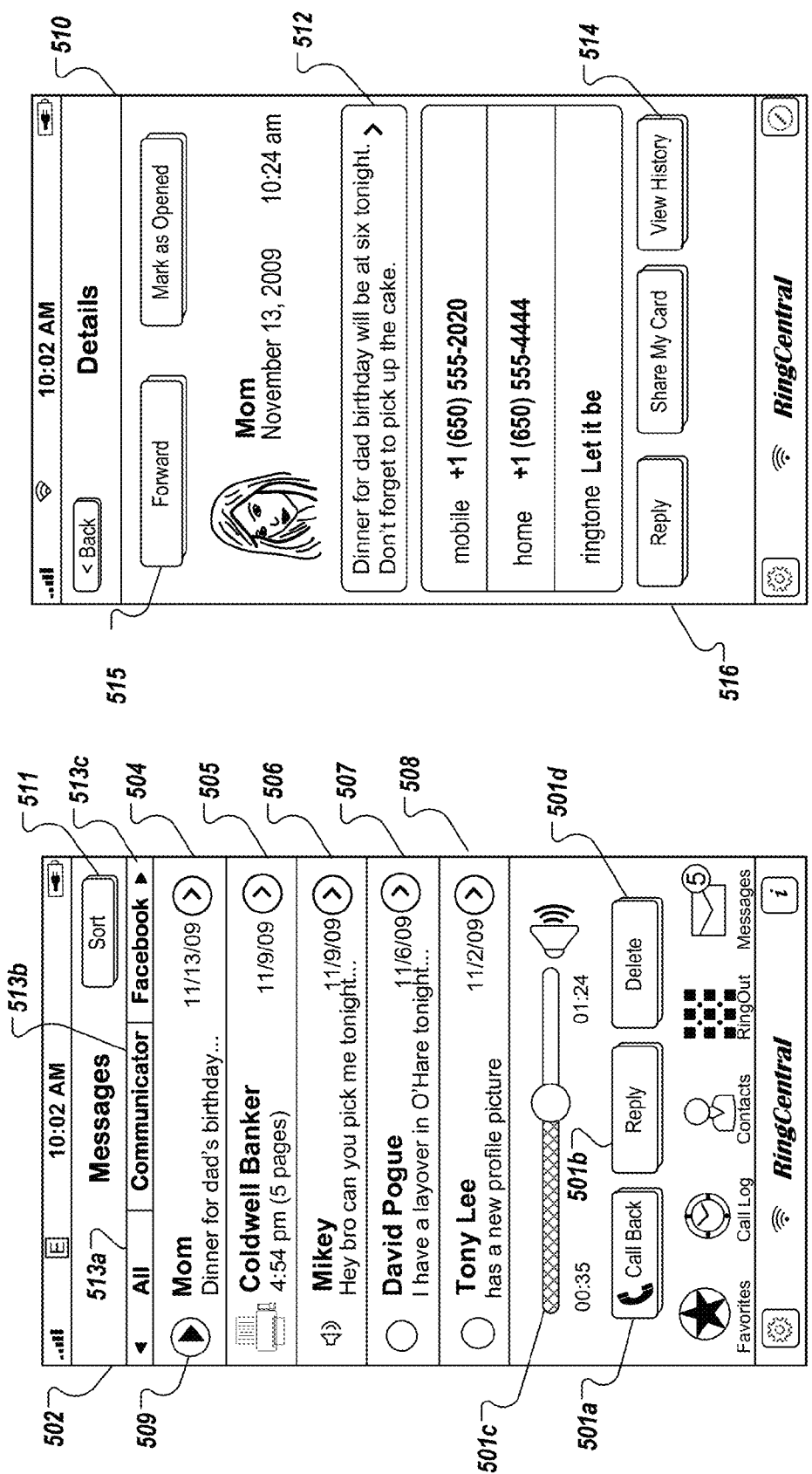

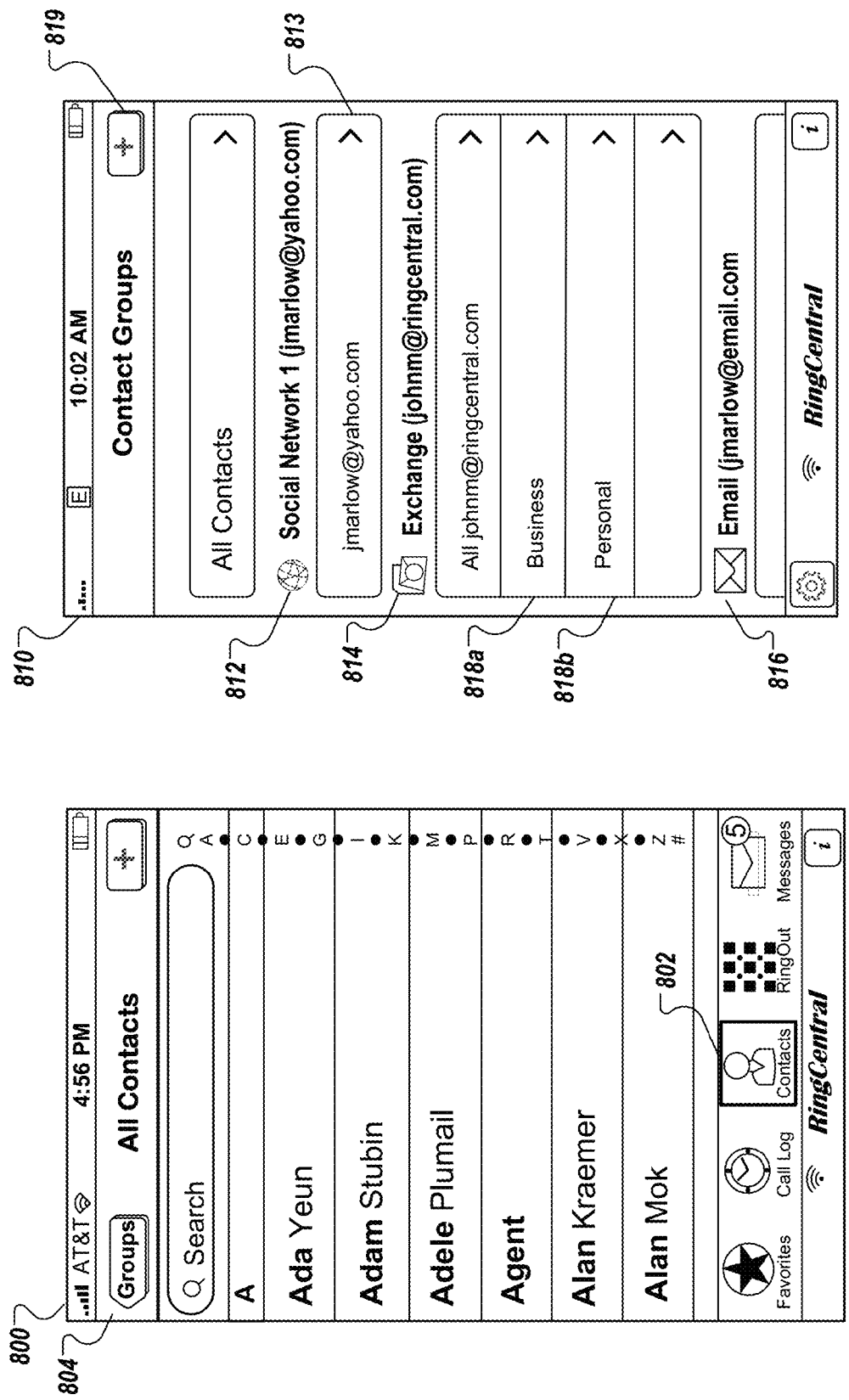

UNIVERSAL CALL MANAGEMENT PLATFORM

CROSS-REFERENCE TO RELATED APPLICATIONS

This application claims priority to U.S. Provisional Application Ser. No. 61/265,747, filed on Dec. 1, 2009. The disclosure of the prior application is considered part of and is incorporated by reference in the disclosure of this application.

TECHNICAL FIELD

This subject matter relates to managing communications for devices.

BACKGROUND

Advances in wireless networking and messaging technologies have given mobile users many choices to access Internet contents and services. Existing devices and platforms include personal digital assistants (PDAs), cell phones with wireless application protocol (WAP) or short message service (SMS), email devices supporting Post Office Protocol 3 (POP3) and/or (Internet Message Access Protocol) IMAP, and instant messaging. While such devices and platforms allow users to access various content, differing devices do not communicate with each other using the same platform. Thus, business and individual mobile users must make challenging decisions to obtain mobile access to services provided by these platforms using different devices.

SUMMARY

Systems, methods and computer program products for enabling integration between various internet- or non-internet based communication services (e.g., as provided by different communications platforms and service providers) using a universal platform are described. In some implementations, a service manager is provided that can integrate call management capabilities with multiple communications platforms using the universal platform to enable seamless communication between the various platforms. For example, interactions between individual users on one or more platforms can be tracked in a single conversation history as a threaded interface. The universal platform can integrate with various platforms and third party protocols and services to provide call features that include, for example, call forwarding, call handling, multiple greeting prompts, call screening rules, ring-out rules, international calling, caller ID rules, after hours, and announcement prompts.

In some implementations, a method can include receiving a communications request from a sender, the communications request being sent using a first communications platform; processing the communications request using one or more call handling rules; and transmitting a communications response to the sender using a second communications platform.

In some implementations, a device can include a service manager for managing one or more calls or messages received on a mobile device, the service manager configured to provide call handing services using multiple communications platforms for handling the one or more calls or messages; and an interface manager to display an interface on the mobile device, the interface configured to receive a user selection of a communication platform for handling the one or more received calls or messages.

The details of one or more implementations are set forth in the accompanying drawings and the description below. Other features, objects, and advantages of the techniques will be apparent from the description and drawings, and from the claims.

DESCRIPTION OF DRAWINGS

FIG. 4C shows an example of an introductory greeting interface.
FIG. 4D shows an example of a call forwarding interface.
FIG. 4E shows an example of a voicemail greeting interface.
FIG. 4F shows an example of a general call interface.
FIG. 4G shows an example of "After Hours" options.
FIG. 4H shows an example of a call screening interface.
FIG. 4I illustrates an example of a detail interface.
FIG. 4J shows an example of an outbound interface.
FIG. 5A shows an example of a message interface.
FIG. 5B shows an example of a message detail interface.
FIG. 8A shows an example of a contact interface.
FIG. 8B shows an example of a contact group interface.

Like reference symbols in the various drawings indicate like elements.

DETAILED DESCRIPTION

Virtual Private Branch Exchange Overview

A private branch exchange ("PBX") is a telephone network that serves a business or office, in contrast to a common carrier. A PBX system can include one or more VoIP servers, a call management program, and a gateway between a data and voice network. A virtual PBX (vPBX) system is a PBX system whose VoIP servers, call management program, and gateway are located remotely from the office or business, typically at a vPBX service provider. A mobile device, such as a cellular mobile device, is a portable computer device that can wirelessly connect to a data network or a voice network or both. A mobile device typically has a display screen or a keyboard, or both. A mobile device can be of the form of a cellular telephone, a personal digital assistant (PDA), a smart phone, a tablet, or other portable device that includes a telephony transceiver and the like. An extension is a subtree or branch from a main number assigned in a telephony system. An extension can be assigned to a device, such as a mobile device or landline phone, that is connected to a PBX system. The PBX system operates as a switchboard for the extensions. A user is a person who uses the vPBX system. A call is a connection between a calling party and a called party over a network. The network can include a voice network, a data network (e.g., including fax capability), or both. A caller, or calling party, is a person or device who initiates a call. A callee, or called party, is a person or device who receives a call.

Call Management System Overview

Figure 1:
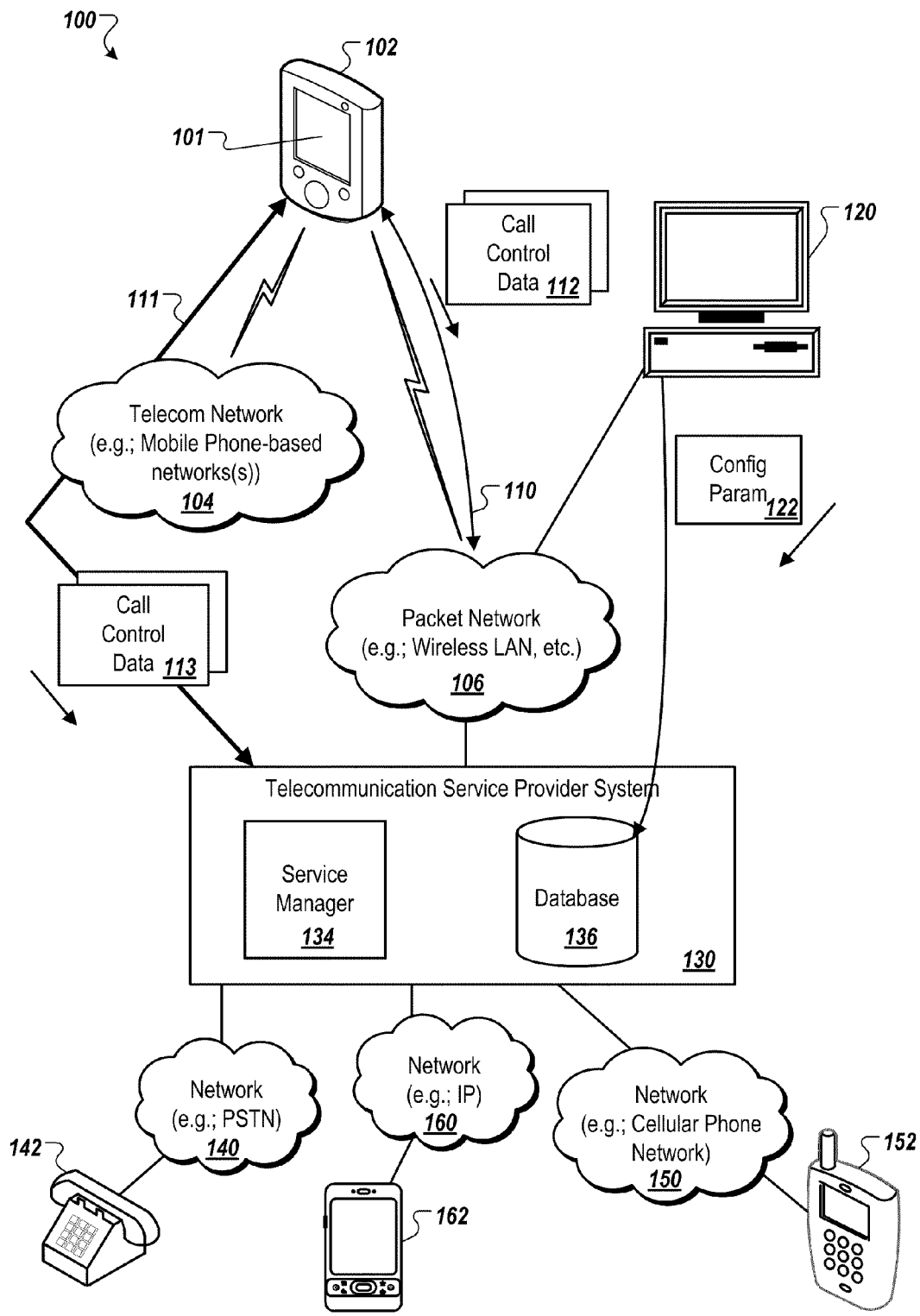
FIG. 1 is a block diagram of a call management system.

FIG. 1 is a block diagram of a call management system 100. As shown in FIG. 1, the mobile device 102 can be configured to communicate using multiple modes of communication (e.g., "multi-modal channels of communication"). The network 104 can operate in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and other communications protocols such as Session Initiation Protocol and the like. The network 106 can operate in accordance with a second mode of communication. Examples of the second mode of communication can include VoIP phone technologies, wireless LAN technologies (e.g., telephone technologies/standards, such as WiMAX and any other IEEE 802.xx-based technologies/standards), and the like. Any number of modes is possible.

The mobile device 102 can be configured to interact with a telecommunication service provider (TSP) system 130 over a call control communications channel, which in some implementations can be a broadband call control channel 110. In some implementations, the broadband call control channel 110 can be established in the network 106 (e.g., in the same or separate channel used to convey voice/video data, such as in a Session Initiation Protocol ("SIP") message). In some implementations, another narrowband call control channel 111 can be established in the network 104 (e.g., a mobile operator can provide in the same or separate channel used to convey voice/video data, such as in an Short Message Service ("SMS") message). The mobile device 102 and/or the TSP system 130 can be configured to establish narrowband call control channel 111 and/or broadband call control channel 110 so that the mobile device 102 and/or the TSP system 130 can transmit and/or receive the call control data 113 (over the narrowband call control channel 111) and/or call control data 112 (over the broadband call control channel 110).

The TSP system 130 can be configured to effect a number of call controlling functions that can be performed remotely from the mobile device 102. For example, the TSP system 130 can perform call control operations in association with a first call from a phone 142 via the network 140 and/or a second call from a phone 152 via the network 150 and/or a third call from a phone 162 via the network 160.

The mobile device 102 can include an interface 101 for facilitating generation, receipt, processing, and management of the call control data 112/113 for delivery over the narrowband call control channel 111 and/or the broadband call control channel 110. The interface 101 can be configured to implement various functionalities, including receiving inbound calls, dialing outbound calls, and click to call generating a combined inbound and outbound call.

In some implementations, the TSP system 130 can include a service manager 134, and a database ("DB") 136. The TSP system 130 can provide for bridging calls generated by disparate telecommunications technologies associated with communications devices 142 and 152 and 162. For example, as an alternative to answering an inbound call on the mobile device 102, the call can be recorded (such as voice mail) on the mobile device 102 and/or on the TSP system 130 and simultaneously reviewed on the mobile device 102 via the user interface 101. During call recording, the inbound call can be answered dynamically at the mobile device 102 and/or transferred to one or more of communications devices 142, 152, and 162. Completed recordings (e.g., announcements, voice mail, etc.) can be reviewed at the mobile device 102 via user interface 101.

The service manager 134 can be configured to interact with a remote computing device 120 or with the mobile device 102 to receive configuration parameter data ("conf param") 122. Further, the service manager 134 can be configured to store configuration parameter data 122, and responsive to such data, the TSP system 130 can be implemented by a user to control inbound calls before, during, or after reaching the mobile device 102. Further, the service manager 134 can be configured to store in the database 136 audio or video files recorded via the user interface 101 on the mobile device 102 and transmitted to the TSP system 130 via the narrowband call control channel 111 and/or the broadband call control channel 110.

Telecommunication Service Provider System Overview

Figure 2:
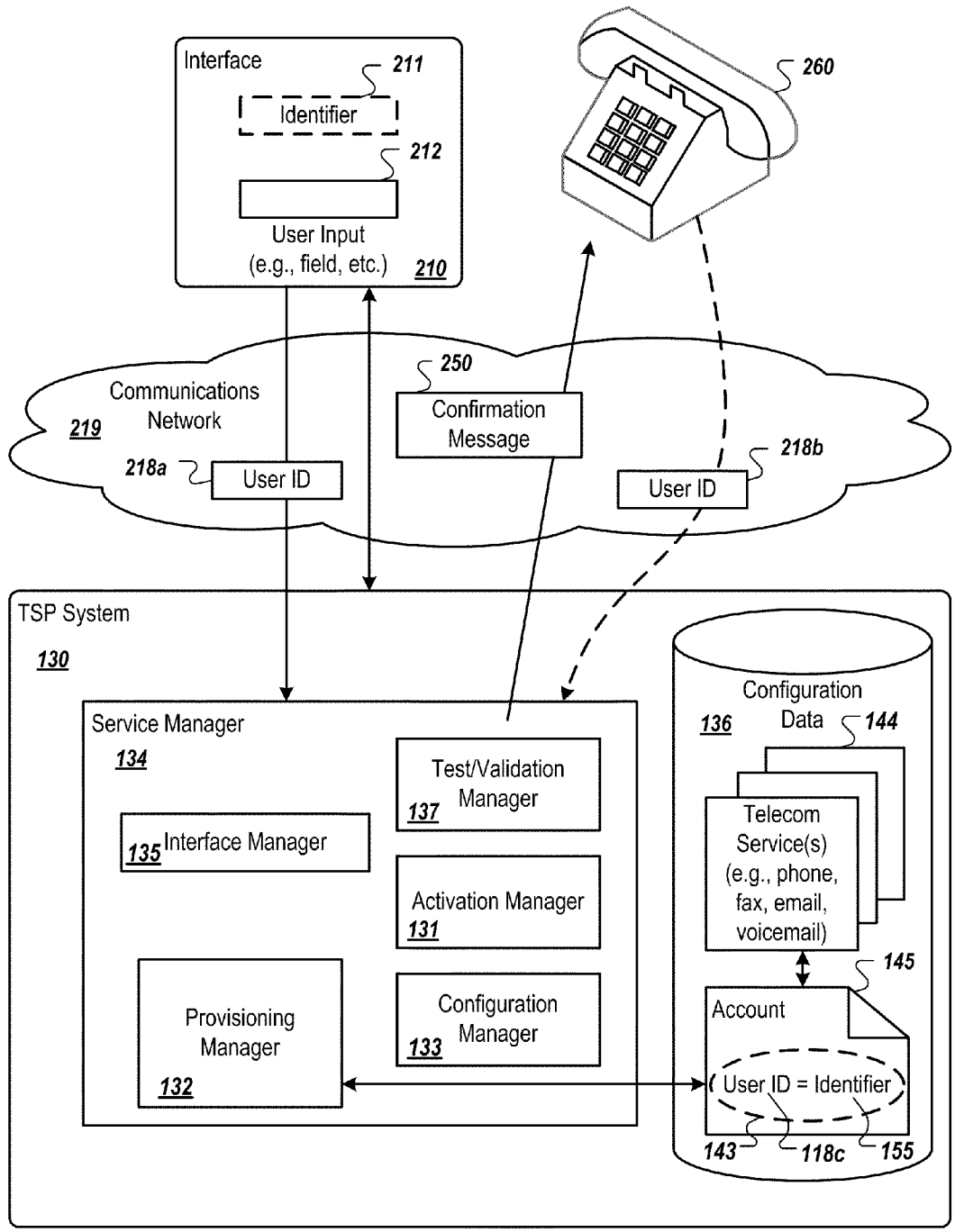
FIG. 2 illustrates an example of components associated with a telecommunications service provider system.

FIG. 2 illustrates an example of components associated with the TSP system 130. Referring to FIG. 2, the service manager 134 of the TSP system 130 can be configured to receive data representing a request to activate a subset of virtual PBX services. The data can include user identification information, such as user ID 218a or user ID 218b, either of which can be sufficient to activate the virtual PBX services. The TSP system 130 can be configured to receive user IDs 218a and 218b, such as from a communications network 119 from an interface 210 on a mobile device.

The user IDs 218a and 218b can represent a telephone number for a phone 260 or a mobile device transmitting an activation request to activate the virtual PBX services on the mobile device. In some implementations, the mobile device can be reachable via an identifier 155, and the identifier 155 can be used as an extension for which the virtual PBX services can be rendered. The user IDs 218a and 218b can represent the same user identification number, but indicate that the user identification number may have been obtained by different techniques (e.g., by way of interface 210 or by way of call data).

An identifier (e.g., identifier 155) can be a telephone number (e.g., a toll-free telephone number, such as a main telephone line) for accessing virtual PBX services. An identifier can also be an email address, or any other symbol (or set of symbols) that represents a common contact identifier for a group of contact identifiers, such as a group of extension numbers for a PBX. Prior to activation, an identifier can be associated with a subset of virtual PBX services of TSP system 130 that are yet to be provisioned and activated. A "user identifier" (e.g., user ID 118c) can refer to a contact identifier (such as the phone number of the phone 160 or mobile device) that can be associated with an extension number in a group of extension numbers. A "user identifier" can also be a facsimile number for a fax machine, an email address of an email account, or a voice mail address, to name a few examples.

A mobile device can communicate with the TSP system 130 and submit information input by the user using the interface 210. As discussed above, the user ID 218a can be contact information, name, telephone number, email address, or a main telephone number selected by the user trying to activate the account. The database 136 can be configured to store data representing configuration data 144 for configuring the virtual PBX services. In some implementations, configuration data 144 can be pre-configured to provide a discrete set of virtual PBX services that, for example, can be activated by the service manager 134 using user IDs 218a and 218b, without requiring other information. Configuration data 144 can include the identifier 155 for accessing the virtual PBX services, where the identifier 155 can be associated with other configuration data 144 either prior to, or after, the TSP system 130 receives the data representing the request to activate or access the virtual PBX services.

In some implementations, the TSP system 130 can be configured to generate signals for transmission to the phone 160 to confirm successful activation of the telecommunications services. In some implementations, the signals can be of the form of a confirmation message that is sent to the mobile device initiating the activation request. For example, the confirmation message 250 can include signals that cause the phone 160 to ring, among other things, thereby confirming that a call to the identifier 155 can be routed to a communications device associated with user IDs 218a or 218b. As described above, the identifier 155 can specify a main telephone number (or main number) for accessing a subset of virtual PBX services.

In some implementations, configuration data and related parameters for configuring the virtual PBX services can be accessed via an internet browser. For example, the user can access the configuration data and related parameters by logging onto account 145 using the identifier 155. The user can be authenticated to confirm authorization before the configuration and related parameters can be viewed and modified. Once authenticated, the user can be presented with a call handling interface through which configuration data associated with the virtual PBX services can be accessed. In some implementations, the configuration data can include parameters pertaining to call handling rules for handling incoming calls based on the call handling rules. For example, when an outside caller calls the virtual PBX main number for a small business, and chooses an extension, the extension user associated with that extension can be reached on a predefined mobile device, home telephone, office phone or other phone type according to the call handling rules. In some implementations, the user can activate, deactivate, add, remove or modify one or more call handling rules or configuration parameters associated with the virtual PBX services In some implementations, the TSP system 130 can generate an interface 210 to be displayed on the phone 160 (where the phone 160 has a display for displaying information). The interface 210 can be configured to receive user input, which can be a field 212 configured to accept data, such as user identification information (e.g., such as a user identifier, which can be represented as user ID 218a). Optionally, the TSP system 130 can generate a representation 211 of an identifier to present in the interface 210. The representation 211 can be a toll-free number as a main telephone line associated with the virtual PBX services. The interface 210 can be accessible as a web page at a particular URL.

In some implementations, where the phone 160 is a mobile device, the interface 210 can be generated by an application on the mobile device. The mobile device can receive the information such as the main identification number from the TSP system 130 (or the server), and present the main identification number in the interface 210 presented by the virtual PBX services application running on the mobile device. In some implementations, the TSP system 130 or the virtual PBX services application running on the mobile device can present field 212 simultaneously (or substantially simultaneously) to the presentation of representation 211 of the identifier. In some implementations, the TSP system 130 can configure configuration data 144 (or a portion thereof) prior to presenting either field 212 or representation 211 of an identifier or both. As such, little or a negligible amount of information can be sufficient to provision a subset of virtual PBX services, which can be defined by the pre-configured portions of the configuration data 144. In some implementations, the subset of virtual PBX services can operate as a default set of services, thereby reducing or eliminating the need for the user to perform an initial and/or a complicated configuration of telecommunications services. Further, the TSP system 130 or the virtual PBX services application running on the mobile device can maintain the presentation of interface 210 during the activation of the subset of virtual PBX services, without transitioning to other interfaces. In view of the foregoing, a discrete set of virtual PBX services can be provisioned and activated without transitioning away from the interface 210. In some implementations, this can simplify the procurement of virtual PBX services.

In some implementations, the TSP system 130 can test and validate successful activation of the subset of virtual PBX services, and can confirm the validation by, for example, generating a call including a confirmation message 250 to the phone 160 or the mobile device from which the activation request was sent. If a user identifier is entered into the interface 210, then TSP system 130 can generate a call to the user identifier number to confirm activation of the subset of virtual PBX services. In some instances, the call can include the confirmation message 250 to the user identification number or the mobile device sending the activation request, substantially simultaneously to the presentation of either field 212 or representation 211 of the identifier in the interface 210. In some implementations, the confirmation message 250 can also include an automated-voice notification that the activation has been complete. Alternatively, the confirmation can be sent to other contact endpoints provided by the mobile device, such as an email address, a fax number, or SMS address, or to the virtual PBX services application running on the mobile device. In some implementations, once the virtual PBX services application receives a confirmation from the server that the service is activated successfully, the application can present a summary page or confirmation to the user in an interface on the mobile device.

In the example shown, the services manager 130 can include one or more of the following: a provisioning manager 132, an activation manager 131, and a test/validation manager 137. Provisioning manager 132 can operate to configure configuration data 144 to provide a subset of virtual PBX services in association with, for example, the user account 145. While the user account 145 can include data representing user identification information (e.g., user IDs 218a and 218b), the user account 145 also can include data representing identifier 155, and/or data representing an association between the user identification information and data representing identifier 155. In some implementations, the provisioning manager 132 can operate to configure configuration data 144 prior to receiving a request to provision a set of default services. In some implementations, the provisioning manager 132 can operate to configure configuration data 144 after receiving the request.

To provision telecommunications services once a request has been made, the provisioning manager 132 can determine either the user ID 118c or the identifier 155, or both, and form an association 143 with which to activate (or subsequent access) the virtual PBX services. In some instances, the provisioning manager 132 can determine both the user ID 118c and the identifier 155, and configure the user account 145 to include both parameters. For example, the user ID 118c can be received as the user ID 218a via the interface 210. In some implementations, the identifier 155 can be selected when the user selects representation 211 of an identifier from a pool of identifiers. The provisioning manager 132 can determine the selected identifier and store the selected identifier in the user account 145, and can remove the selected identifier from the pool of available identifiers so that the selected identifier can no longer be provisioned. In some implementations, the identifier 155 can be generated without feedback from the user (e.g., as a pre-determined identifier that can be pre-selected or randomly determined), with the provisioning manager 132 storing the pre-determined identifier in the user account 145 as the identifier 255. In this case, either the ID 218a or the ID 218b can be sufficient for provisioning, configuring, and activating telecommunications services such that the user need not enter a selection for an identifier or other information.

The activation manager 131 can be configured to activate the user account 145 once the user account 145 has been provisioned with configuration data defining a subset of virtual PBX services. The identifier 155 can be used to access the activated subset of virtual PBX services. For example, where the identifier 155 is a telephone number, then the telephone number can be a main line that can provide access to the virtual PBX services. For example, where the identifier 155 is a telephone number, then the telephone number can be a main line that can provide access to the telecommunications services defined by, for example, the user account 145. In some implementations, the test/validation manager 137 can optionally be used to validate successful provisioning and activation of the subset of virtual PBX services. For example, to validate a telephone number provided as user ID 218a, the test/validation manager 137 can be configured to make a call to the telephone number associated with phone 160. As another example, the user ID 218a can be an email address where the test/validation manager 137 can be used to send an email massage to the email address to validate that the email address can be implemented as an extension.

In some implementations, a single submission of data (e.g., user ID 218a) to the TSP system 130 can enable the user to acquire an account to use the virtual PBX services. In some implementations, the user need not provide other data (e.g., contracting, billing, configuration, or other information) to activate the subset of virtual PBX services. Once the user account 145 is activated, the telecommunications services can be used. That is, the user can start using the primary identification number (e.g., a toll-free telephone number) associated with the virtual PBX services as a common contact identifier 155 (or address) nearly instantaneously, so that third parties can immediately access the associated virtual PBX services (e.g., the user's customers can contact the user at an extension linked to the identifier 155). For example, if the virtual PBX services include a call-forwarding service, a call made to a specified toll-free telephone number (e.g., the identifier 155) can be forwarded to a telephone number, such as user ID 218a.

Examples of the interface 210 can include physical interfaces (e.g., a display on a mobile device) and virtual interfaces (e.g., a web page, panel, window, display, palette, tab, screen, or the like in an application program running on the mobile device). In some implementations, the user can provide additional data in a single submission to request activation of telecommunications services. Further, the TSP system 130 can include one or more servers, software applications, application programmable interfaces (APIs), logic (e.g., software or electrical/hardware logic), or any combination thereof. For example, in addition to the provisioning manager 132, an activation manager 131, a test/validation manager 137, the service manager 134 can include other components, such as, for example, a configuration manager (not shown), any of which can be implemented in hardware, software, or any combination thereof.

In some implementations, the telecommunications services can be associated with configuration data that represents any combination of virtual PBX services, such as services selected from the group of call forwarding, call routing, facsimile, email, text messaging, voice messaging (e.g., voice mail), extension support, private branch exchange, call handling, multiple greeting prompts, call screening rules, ring-out rules, international calling, caller ID rules, after hours rules, announcement prompts, and the like. A default configuration for the virtual PBX services can be stored in the database 140 as, for example, the configuration data 144.

In some implementations, the term "single submission," such as single submission of data, can refer to sending, providing, or transmitting sufficient data to activate or request telecommunications services from an interface without requiring an interface transition to provide additional data to request the same telecommunications services. An example single submission of data can be clicking a button on a graphical user interface (e.g., "submit", "send", or "activate" buttons, or the like) on a mobile device.

In some implementations, "provisioning" can refer to providing capabilities for telecommunications services (e.g., virtual PBX services) to the user or customer account, including transmission of voice, data, or both to a telephone number, facsimile number, email address, voicemail address, the like, or any combination thereof. This can include providing for the hardware, software, storage, processing power, administrative requirements and the like necessary for supporting the services for a given account. The account can be a placeholder account not currently activated or associated with a particular user.

In some implementations, "configuring" can refer to modifying data for a user account to configure one or more virtual PBX services. In some implementations, the term "activating," can refer to enabling a user account and its data (e.g., configuration data) to provide virtual PBX services. In some implementations, the foregoing system, components, elements, and processes can be varied in number, structure, function, configuration, implementation, or other aspects and are not limited to those shown and described.

To illustrate the operation of TSP system 130, the following example is provided. However, it should be understood that the example is non-limiting and that the virtual PBX service provider system 100 can be applied in various applications. Initially, a request for activation can be handled by the provisioning manager 132, for example, by creating and storing the user account 145 in the database 140. The user account 145 can include a binding of a cellular telephone network (CTN) (e.g., 1-650-555-9876) to a timeslot interchange device (e.g., 1-888-555-1200), which in turn can be associated by the association 143 with virtual PBX services that can be defined by the configuration data 144. The configuration data 144 can be used to configure the virtual PBX services including different types of services (e.g., call extensions, facsimile, email, voicemail, and the like), and number of services in each type (e.g., four call extensions, an email box, and a facsimile), any combination of services types, and/or one or more rules to, for example, govern how services are rendered (e.g., for extension 1, if a call is not answered by the third ring, send the caller to a voicemail box). The configuration manager 133 can be used to create the configuration data 144. In some implementations, the configuration data 144 can be pre-defined (e.g., defined before a user initiates an activation request). The configuration manager 133 can also be used or add, remove, or modify the virtual PBX services after the virtual PBX services have been initially activated. Additional databases can be used to store automatic number identification (ANI) data, calling name (CNAM) data, dialed number identification service (DNIS) data, or any other data or combination thereof. These additional databases can be accessed by the provisioning manager 132, the configuration manager 133, the activation manager 131, or other system components to access or look up additional data associated with a CTN. For example, the name of a caller can be looked up using a telephone number (e.g., a CTN). Other call data (e.g., caller ID or ANI data) can be determined using a telephone number (e.g., a CTN).

In some implementations, after a placeholder account is provisioned and configured (e.g., configured in accordance with default configuration data), the placeholder account and the virtual PBX services associated with the placeholder account can be activated. To activate the placeholder account, the activation manager 131 can, for example, mark an "activated" flag or field in the placeholder account, or in the configuration data 144 thereof, to indicate that the placeholder account and its services have been associated with a user and have been activated. In some implementations, activating an account (e.g., associating a placeholder account with a user ID) can be done in real-time or instantaneously, at least as perceived by the user. By pre-provisioning one or more placeholder accounts before the user requests for activation are received, the TSP system 130 can have a set of pre-provisioned accounts available. When the user request is received, the association between a pre-provisioned account and the user can be accomplished without hardware and/or personnel delays. The association between the placeholder account and a user ID can be fully automated, and can be accomplished within seconds as opposed to days or weeks as required by conventional provisioning and activation techniques. In some implementations, physical resources necessary for account setup and configuration can be pre-provisioned, and an account can be configured and activated by associating the different resources with a user ID. Because the major bottlenecks in account setup in conventional techniques have been eliminated before a user request is received, the account activation can be effectively instantaneous to the user making the request.

In some implementations, the test/validation manager 137 can be used to test or validate a CTN or to confirm activation. For example, to test activation, the test/validation manager 137 can interact with a communications interface (e.g., a call handler) to call a timeslot interchange (TSI) associated with the CTN, which, in turn can cause the TSP system 130 to generate a call to the CTN after a successful activation. The communication interface can detect whether the TSI is associated with virtual PBX services provided by the TSP system 130. If so, the TSP system 130 can look up the associated CTN in the database 140, retrieve information relevant to the user account 145, and route the call to the CTN, which is received at the phone 160 or a mobile device sending the activation request. Caller data, such as caller-ID data, or the TSI can be sent to the telephone 160 or the mobile device sending the activation request. Alternative designs for the telecommunications service provider system are also possible.

The TSP system 130 can include any number and any combination of the following: web server, databases, media server, call handler, and service manager server. In some implementations, the TSP system 130 can include an additional server for handling requests from a virtual PBX services application running on a mobile device. This additional server can be implemented as part of the web server, or a standalone server.

Example Device Implementation

Figure 3:
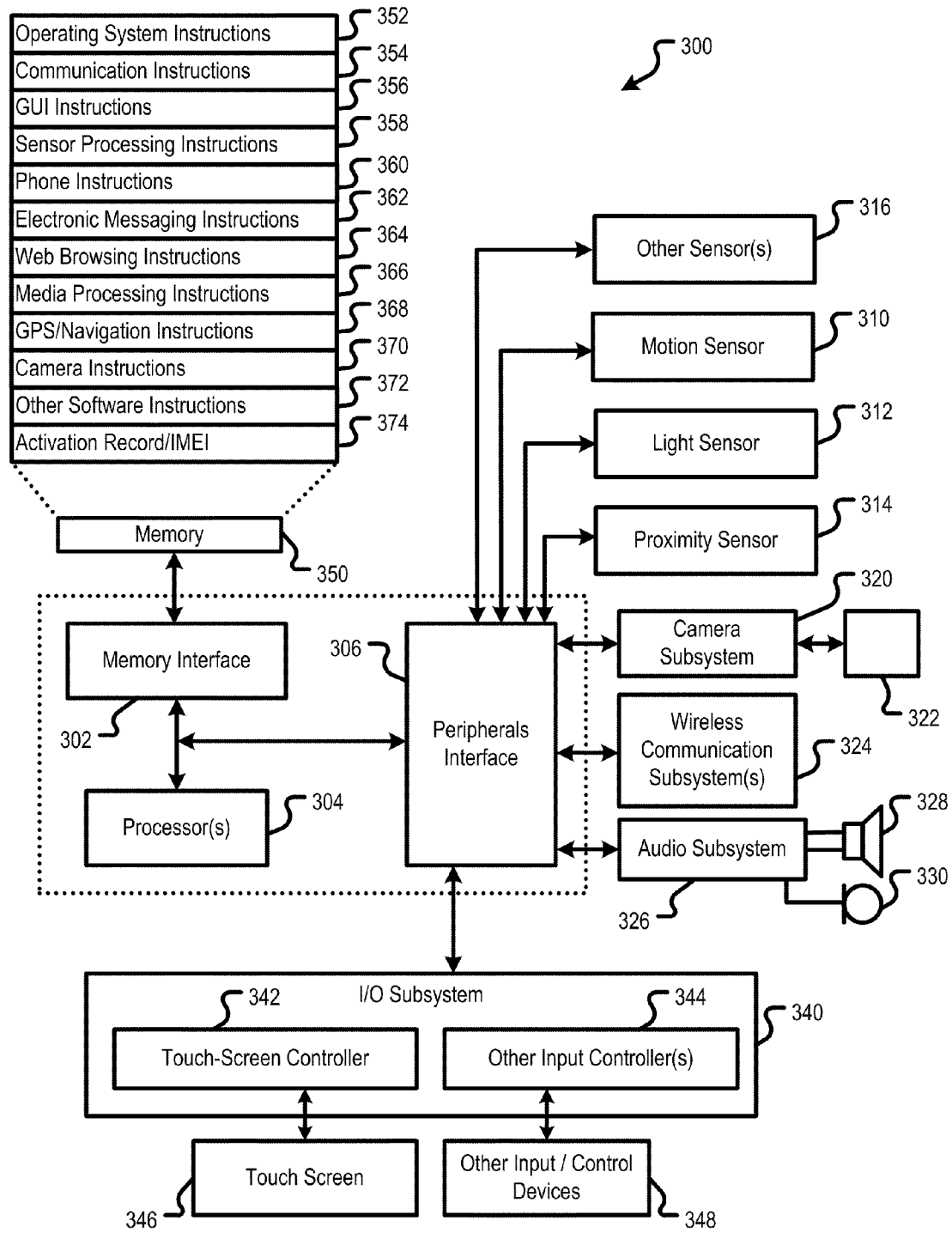
FIG. 3 is a block diagram of an example architecture of a communications device.

FIG. 3 is a block diagram of an example architecture 300 of a communications device. In some implementations, the communication device can be a mobile device, or any communications device used in the telecommunication network 100.

Referring to FIG. 3, the communications device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the communications device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the communications device is intended to operate. For example, a communications device can include communication subsystems 324 designed to operate over a GSM network, a GPRS network, an EDGE network, a Wi-Fi or WiMax network, and a Bluetooth™ network. In particular, the wireless communication subsystem 324 can include hosting protocols such that the communications device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, the pressing of a button for a first duration can disengage a lock of the touch screen 346; and the pressing of the same or different button for a second duration that is longer than the first duration can turn power to the communications device on or off. The user can customize a functionality of one or more of the buttons. The touch screen 346 can, for example, also be used to implement virtual or soft buttons and/or a keyboard.

In some implementations, the communications device can present recorded audio and/or video files, such as MP3, AAC, and MPEG files. In some implementations, the communications device can include the functionality of an MP3 player.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the communications device can be implemented in hardware and/or in software, including in one or more signal processing and/or application specific integrated circuits.

Universal Call Management Platform

As discussed above, the service manager 134 allows users to access virtual PBX and other call management services (e.g., after the user account has been activated and the user has been authenticated). For example, users can submit identifier 155 (e.g., through interface 210), which can be a telephone number, to the service manager 134 to access a subset of virtual PBX services.

In some implementations, in addition to allowing users to access virtual PBX and other call management services, the service manager 134 of the TSP system 130 can also provision other call and non-call management services by enabling integration between various internet- or non-internet based communication services (e.g., as provided by different communications platforms and service providers) using a universal platform. Through service and platform integration, the server manager 134 can provide a unique service that integrates call management capabilities with multiple communications platforms using the universal platform to enable seamless communication between the various platforms. For example, interactions between individual users on one or more platforms can be tracked in a single conversation history as a threaded interface within the service. The universal platform can integrate with PSTN, SIP, SMTP, POP3, SMS (Short Message Service), MMS (Multiple Media Service), and third party protocols and services to provide call features that include, without limitation, call forwarding, call handling, multiple greeting prompts, call screening rules, ring-out rules, international calling, caller ID rules, after hours, announcement prompts, and the like.

In some implementations, where geographic capability is available, the service manager 134 can use the user's geographical position (e.g., via the mobile device's global positioning system (GPS)) to invoke or activate defined call management and message handling rules or functions. In addition to the PBX functionalities, the user can also define message handling rules for non-voice related messages (SMS, email, etc.). For example, the user can define a message handling rule for configuring the service manager 134 to automatically reply to a particular message from a specific individual. For example, when an SMS is received, the service manager 134 can automatically reply to the sender with a predefined message.

Additionally, the universal platform can facilitate message handling that includes, without limitation, receive, reply, compose, delete, transcribe, and synchronize message communication via voicemail, fax, email, SMS, MMS, and various social networking message medium. Integration with third party social networks also can include, without limitation, Facebook®, Twitter®, MySpace®, LinkedIn®, Bebo®, Orkut® and the like. Users can also utilize the universal platform for real-time call control and message notification to transfer calls, receive update notification, as well as reply via automated text-to-speech voice responses. In addition, the universal platform can provide the ability to synchronize contacts, friend/buddy list, and the like from multiple platforms into one unified address book synchronously or asynchronously, as will be discussed in greater detail below.

FIGS. 4-8 shows examples of various interfaces supporting the universal platform that can be used to configure/manage call and non-call management services. In some implementations, the interfaces can be generated by the interface manager 135, and can be used to configure call and non-call management services for a single user, line or account.

To facilitate discussion, the example interfaces are set forth in the context of a mobile device having a touch sensitive screen for receiving user input, such as an iPhone® made by Apple, Inc. However, the same principles apply to other mobile devices. The examples should not be construed to limit the claims in these respects.

Also, interfaces shown in FIGS. 4-8 can display one or more user interface elements that are user-selectable. Each user interface element can be associated with an application that can be invoked by a user input selecting the corresponding user interface element with an input device. Each application can enable the user to interact with one or more call and no-call based services and functions, as will be discussed in greater detail below.

In some implementations, the interfaces shown in FIGS. 4-8 can be accessed only after a user has setup an account and activated the virtual PBX services associated with the account. The user can associate, for example, the mobile number to identify the user to the outside callers and at the TSP server end. The virtual PBX services activated can include a subset of pre-provisioned and pre-configured virtual PBX services, optionally customized based on information provided during the activation by the user. For example, a pre-provisioned service can include call forwarding to the contact number provided by the user or to multiple numbers according to call forwarding rules set by the user during activation. After setup and authentication, the user interfaces can be used to modify the call forwarding rules.

In some implementations, example interfaces shown in FIGS. 4-8 can be presented to a user as an application available in the mobile device. For example, the application can be represented as an icon that can be selectable by the user of the mobile device. The icon representing the application can be invoked by a user input selecting it with a pointing device or touching it on the touch sensitive screen of the mobile device. In some implementations, the application can be configured to run as a default program and is activated whenever the mobile device is first turned on. In some implementations, one or more functions of the application can be implemented as separate modules that each has its respective icon and can be invoked separately. For example, the activation and configuration functions can be implemented as a separate module from the telephone/voicemail module. Once the applicable application icon is invoked, an initial interface (as will be discussed below) can be presented offering a user the option to use or configure an existing virtual PBX service account, or to activate and configure a new virtual PBX service account.

Figures 4A, 4B:
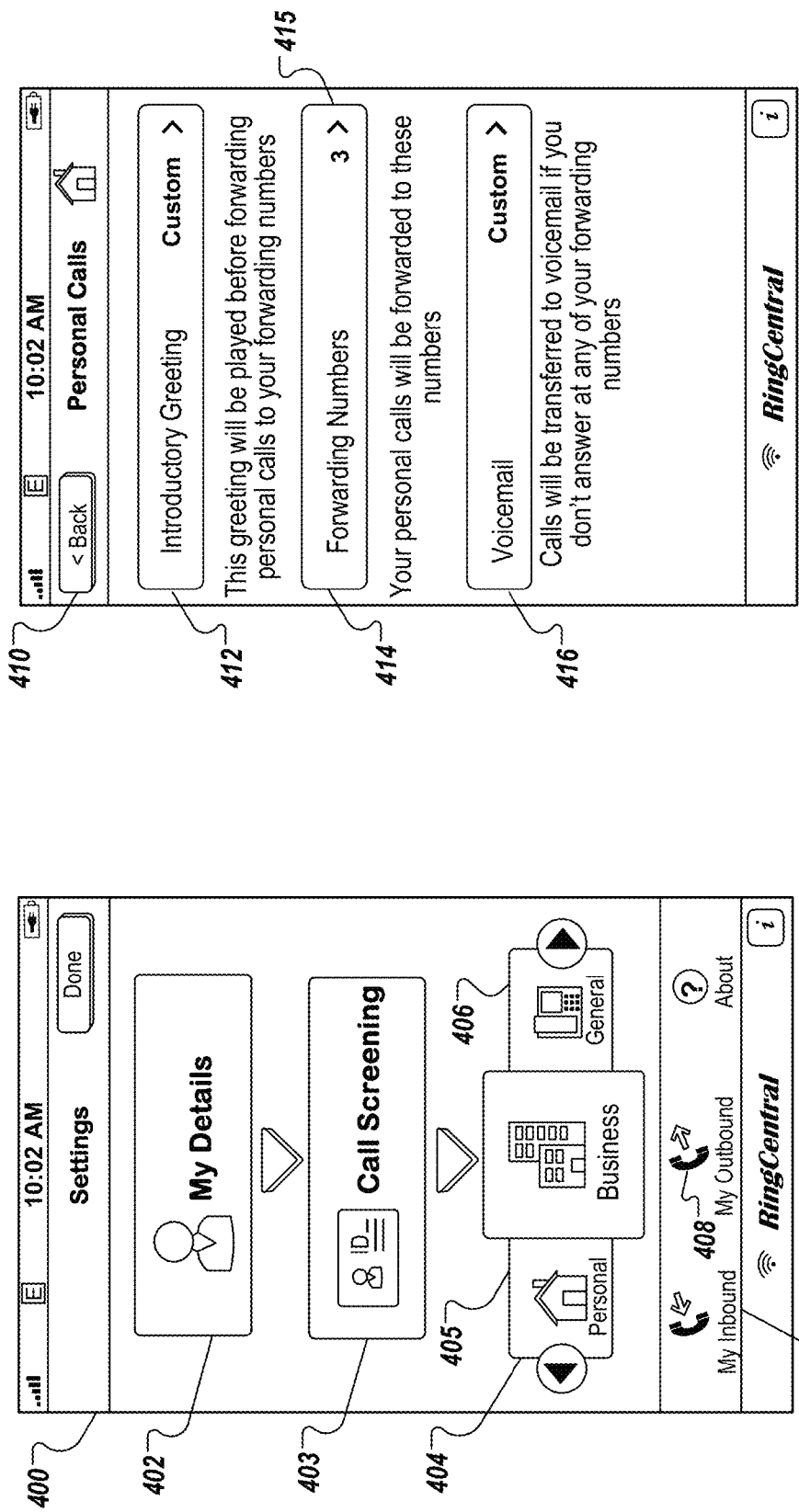
FIG. 4A shows an example of an initial interface.
FIG. 4B shows an example of a personal call interface.

FIG. 4A shows an example of an initial interface 400. Referring to FIG. 4A, the initial interface 400 can include a detail interface element 402, a call screening interface element 403, a personal interface element 404, a business interface element 405 and a general interface element 406. In some implementations, interface elements 402-406 can be presented to the user upon selecting the inbound interface element 407, which allows the user to configure rules associated with inbound calls.

While the initial interface 400 displays a personal interface element 404 (e.g., for accessing one or more call handling rules associated with incoming personal calls), a business interface element 405 (e.g., for accessing one or more call handling rules associated with incoming business calls) and a general interface element 406 (e.g., for accessing one or more call handling rules associated with incoming general calls), other custom groups also can be created and added into the initial interface 400. For example, the user can configure calls from family members to be directly forwarded to the user's mobile phone while forwarding calls from business associates to the user's office phone.

Depending on the type of virtual PBX services enrolled and activated by the user, selecting the detail interface element 402 can display one or more pre-provisioned and pre-configured virtual PBX services, optionally customized and configured based on information provided during the activation by the user. For example, the detail interface element 402 can display one or more interface elements each pertaining to a different call handling rule. In the example shown, the user has selected a pre-provisioned service that includes call screening for screening all incoming calls to the user. Configuration parameters associated with the call screening can be accessed through the selection of the call screening interface element 404. As another example, in addition to the call screening interface element 403, the detail interface element 402 can display selectable interface elements associated with calling forwarding, voicemail, ring-out, call blocking, privacy director, call waiting, call conferencing, speeding dialing, call recording, queue rules, do-not-disturb and other PBX functions and the like.

When call screening service is selected by the user (e.g., through the selection of the call screening interface element 403), the user can be presented with options associated with configuring call screening parameters for personal calls (e.g., which can be invoked by selecting the personal interface element 404), business calls (e.g., which can be invoked by selecting the business interface element 406), or general calls (e.g., which can be invoked by selecting the general interface element 406).

The personal interface element 404, when selected, allows a personal call interface to be presented, and the user can configure one or more rules pertaining to personal calls using the personal call interface. FIG. 4B shows an example of a personal call interface 410. As shown, the personal call interface 410 can include an introductory greeting field 412 that can present an option (e.g., ON/OFF option) for enabling or disabling an introductory greeting played to a caller when the caller places a call to the mobile device of the user. After the introductory greeting has been played, the caller can then be connected to the user, or alternatively, be routed based on the existing call handling rules (e.g., to one or more call forwarding numbers previously defined by the user).

Where the introductory greeting is enabled, a default greeting or a customized greeting can be displayed to the user. FIG. 4C shows an example of an introductory greeting interface 420. Temporarily referring to FIG. 4C, the introductory greeting interface 420 can present a default greeting selection 422. When selected, the default greeting option 422 allows a default message (e.g., a standard computer-generated greeting) that has been pre-selected or pre-programmed to be played at the time of receiving a call from a caller to the number associated with the mobile device of the user. In some implementations, the greeting can be tailored to a specific personal preference or a particular type of practice or business. In some implementations, the introductory greeting interface 420 also can present a drop down list of greetings that the user can select as the default greeting.

In some implementations, a custom greeting can be specified by selecting the "custom" greeting option 424. In some implementations, a custom greeting can be a voice greeting recorded in advance (e.g., through button 429). In some implementations, a line of text can be entered for all or portions of a custom greeting, and the line of text can be converted into voice recording (e.g., with the assistance of text-to-speech software) that can be played to the caller. For example, a line of text can state "Thank you for calling John Smith" that can be converted into voice recording such that upon connecting a caller to the user "John Smith", the greeting "Thank you for calling John Smith" can be played to the caller. To assist the user in quickly identifying the currently activated greeting option (e.g., whether the default or customer option has been selected), an indicator 425 can be displayed next to the field that has been selected by the user.

In some implementations, the introductory greeting interface 420 can include a user option 427 for playing or previewing all the greetings available or recorded before finalizing the selection. The selected greeting can be played when a call is connected to the number associated with the mobile device, or when the call is transferred to a forwarding number as defined by the user. The user can cancel (e.g., using button 428) or save (e.g., using button 426) any changes made to the greeting rules in the introductory greeting interface 420.

Referring back to FIG. 4B, the personal call interface 410 can also include a call forwarding field 414 that can indicate a number 415 of active forwarding numbers (e.g., the user has three active forwarding numbers). In some implementation, the call forwarding field 414 is enabled only when the user has requested and been provisioned with the call forwarding service. Once activated and enabled, the call forwarding field 414 allows incoming calls to be forwarded to a contact number provided by the user or to multiple numbers according to call forwarding rules set by the user.

In some implementations, instead of displaying the number 415, the personal call interface 410 can display an activate/deactivate status indicator for indicating the active status of the call forwarding numbers. For example, the personal call interface 410 can display an ON/OFF indicator to indicate whether at least one forwarding number is enabled or disabled. As an example, an "ON" indicator indicates that at least one forwarding number is currently active. As another example, the "OFF" indicator indicates that none of the defined forwarding numbers is currently inactive.

When the call forwarding field 414 is selected, the user can be presented with a call forwarding interface. FIG. 4D shows an example of a call forwarding interface 430. As shown in FIG. 4D, one or more types of forwarding numbers, such as a forwarding number 431b associated with a mobile device, a forwarding number 432b associated with "Work", a forwarding number 433b associated with "Home", or another type of forwarding number associated with "Other" type of device(s) 434 can be specified. In some implementations, the forwarding numbers 431b-433b can be manually entered or automatically populated (e.g., the forwarding numbers 431b-433b can be automatically populated based on the information submitted during activation). In some implementations, the information can be extracted from an address book application installed on the mobile device. A text prompt also can be displayed to request the forwarding numbers to be specified.

In some implementations, the forwarding numbers 431b-433b can be configured to ring sequentially (e.g., through option 436) or simultaneously (e.g., through option 435) when a caller calls the number of the user's mobile device. For example, the user can establish a call forwarding setting to allow devices associated with the call forwarding numbers 431b-433b to ring sequentially based on the orders in which the call forwarding numbers 431b-433b are listed (e.g., call forwarding number 432b can be configured with a higher priority than call forwarding number 433b but with a lower priority than call forwarding number 431b). As another example, a call forwarding setting can be established to allow devices associated with the call forwarding numbers 431b-433b to ring simultaneously (e.g., by selecting the option 435) so that devices associated with call forwarding numbers 431b-433b can be simultaneously rung at the time of receiving an incoming call to the user's mobile device.

In some implementations, one or more call forwarding rules can be initiated after a predetermined period. In some implementations, the predetermined period can be defined by the user. For example, an entry can be provided to receive a numeric entry indicating the time (e.g., in seconds) after which the call forwarding rules can be executed. As an example, after receiving an incoming call, the incoming call can be forwarded to a defined forwarding number of the user after three seconds.

In some implementations, to edit an existing call forwarding number, the user can simply select corresponding field 431a, 432a and 433a to invoke an edit forwarding phone number interface through which the user can add, modify or delete a forwarding number.

In addition to the introductory greeting field 410 and the forwarding number field 414, the personal call interface 410 can also display a voicemail field 416. When the voicemail field 416 is invoked, a voicemail greeting interface can be presented to the user. FIG. 4E shows an example of a voicemail greeting interface 440. Similar to the introductory greeting interface 420, the voicemail greeting interface 440 can present a default greeting selection 422. When selected, the default greeting option 442 allows a default voicemail greeting (e.g., a standard computer-generated greeting) that has been pre-selected or pre-programmed to be played when callers are connected to the user's voicemail through which messages can be recorded. In some implementations, the voicemail greeting can be tailored to a specific personal preference or a particular type of practice or business. In some implementations, the voicemail greeting interface 440 can also present a drop down list of greetings that the user can select as the default greeting.

In some implementations, a custom voicemail greeting can be specified by selecting the "custom" voicemail greeting option 444. In some implementations, a custom voicemail greeting can be a voice greeting recorded in advance (e.g., through button 447). In some implementations, a line of text can be entered for all or portions of a custom greeting, and the line of text can be converted into voice recording (e.g., with the assistance of text-to-speech software) that can be played to the caller. For example, a line of text can state "You have reached the voicemail box of John Doe" that can be converted into voice recording such that upon connecting a caller to the voicemail of user "John Doe", the greeting "You have reached the voicemail box of John Doe" can be played to the caller.

In some implementations, the voicemail greeting interface 440 can include a user option 427 for playing or previewing all the voicemail greeting available or recorded before finalizing the selection. The selected voicemail greeting can be played when a call is connected to the user's voicemail. The user can cancel (e.g., using button 448) or save (e.g., using button 449) any changes made to the voicemail greeting rules in the voicemail greeting interface 440.

While the foregoing descriptions pertain to call handling rules associated with personal calls (e.g., as selected using the personal interface element 404), these call handling rules also can be applied to general calls. For example, selecting the general interface element 406 can invoke a general call interface. FIG. 4F shows an example of a general call interface 450. As shown in FIG. 4F, similar to the personal call interface 410, the general call interface 450 can include an introductory greeting field 452 that can be invoked to configure call handling rules associated with introductory greetings, a forwarding number field 454 that can be invoked to configure one or more call forwarding parameters associated with calling forwarding, and a voicemail field 456 that can be invoked to configure rules pertaining to the user's voicemail.

In some implementations, the general call interface 450 also can include a "Normal Hours" tab 458a and an "After Hours" tab 458b. In some implementations, one or more sets of rules pertaining to general calls can be separately configured for each tab. For example, one set of general call rules associated with general or public calls made during normal hours can be configured by selecting the "Normal Hours" tab 458a, and another set of call screening rules associated with calls made after normal hours can be configured by selecting the "After Hours" tab 458b. One of ordinary skill in the art would readily recognize that the general call rules associated with "Normal Hours" and "After Hours" are exemplary and non-limiting, and that other custom call handling configuration also are contemplated. For example, the user can configure a new tab associated with a particular schedule that begins and ends at a predefined hour of the day. As another example, instead of using hours of a day to distinguish two separate set of rules, other criteria also can be used such as days of the week or a data range.

In some implementations, the general call rules for calls made after normal hours can be linked to the privacy hours of the user that can include a block of hours during which all incoming calls are to be intercepted and forwarded based on the call forwarding rules. The block of hours can be designated by a start time and an end time, and calls can be intercepted during the block of time beginning with the start time and ending with the end time. This block of time can be strictly adhered until the start and the end time of the privacy hours have been changed.

FIG. 4G shows an example of options that can be selected under the "After Hours" tab 458b. Referring to FIG. 4G, under the "After Hours" tab 458b, the user can select one of either a message-only option 455 or forwarding call option 457. If the message-only option 455 is selected, the user can automatically activate the voicemail greeting when calls to the user are made after normal hours. Automatically activating the voicemail greeting allows the user to connect callers directly to the user's voicemail without ringing the user's mobile device. The general call interface 450 can also display a voicemail field 459 tailored to calls made after normal hours. For example, separate from the voicemail greeting associated with personal calls, a separate voicemail greeting can be configured for calls made after normal hours.

In some implementations, the service manager 134 can also perform an automated reply to callers via any platform that is shared between the caller/sender and the user. For example, if both the caller and the user are available via SMS messages and social network messages (e.g., via Facebook®), the service manager 134 can automatically respond to an incoming social network message posting with an immediate comment. The automated responses can be customized by the user based any number of criteria that include, but not limited to, time of day, day of week, date range, sender, originating platform, GPS location, and the like.

Upon selecting the voicemail field 459, an interface similar to the voicemail greeting interface 440 can be presented through which the user can define a default voicemail greeting or a custom voicemail greeting to notify the callers that the callers have been routed to the user's voicemail because the calls are made after normal hours.

Alternatively, if the forwarding call option 457 is selected, the user can enable one or more call forwarding rules, and forward the incoming calls directly to one or more forwarding numbers defined by the user instead of the user's voicemail.

In some implementations, personal calls, business calls and/or general calls can be subject to call screening. In some implementations, a call screening interface can be presented upon selection of the call screening interface element 403. FIG. 4H shows an example of a call screening interface 460. Referring to FIG. 4H, upon invoking the call screening interface element 403, one or more call screening rules associated with virtual PBX call screening can be presented. In some implementations, if the user wishes to turn ON/OFF the call screening rules, the user can simply select option 462 (e.g., by sliding the bar 463) to enable or disable the call screening rules.

The one or more call screening rules can be configured to direct incoming calls to one or more designated destinations, depending upon the identity of the callers. For example, the call screening rules can be configured to forward incoming calls with identifiable and recognizable call identification telephone numbers ("caller IDs") directly to the user.

The call screening rules also can be programmed to automatically forward calls with unrecognizable caller IDs to the voice mailbox of the user. The call screening rules further can be configured to forward other incoming calls from calling parties to other parties, or redirect designated calls to an operator. In some implementations, call screening can be accomplished using a look-up table that cross-references a caller identification number to a pre-defined destination.

As discussed above, the call screening rules can be configured to forward calls with identifiable call identification telephone numbers directly to the user, while forwarding calls with unrecognizable call identification telephone numbers to the voice mailbox of the user. In some implementations, a caller identification feature can be used for identifying the telephone number from which the incoming call originates. Alternatively, the administrator can require each caller to identify the name of the caller before the incoming call can be forwarded.

For example, a caller with a blocked caller ID would need to specify the name of the caller under the "If callerID not present" option 464 before the call can be connected. In some implementations, blocked calls connected to the number can be answered on the first ring, and an announcement or greeting can be played to notify the callers that blocked calls are not accepted and can only be connected once the caller has revealed the caller's identity. Other options such as the "If caller not in contact list" option 466 and "screen all calls" option 468 also can be provided. For example, upon selecting the "If caller not in contact list" option 466, callers not in a contact list of the extension user would need to specify the names of the callers. As another example, selecting the "screen all calls" option 468 would require all callers, including callers with identifiable caller IDs and callers who are on the contact list of the user, to specify the names of the callers before the calls can be connected.

As discussed above, the service manager can provision other call and non-call management services by enabling integration between various internet- or non-internet based communication services (e.g., as provided by different communications platforms and service providers) using a universal platform. In some implementations, the universal platform can collect user information (e.g., personal, business or general) to effectuate the integration process.

In some implementations, upon invoking the detail interface element 402, a detail interface can be displayed to the user listing a user profile of the user. FIG. 4I illustrates an example of a detail interface 460 to facilitate the collection of user data and presentation of a user profile.

Referring to FIG. 4I, the detail interface 470 can display an image 471, which can be a two or three-dimensional graphical representation. For example, the image 471 can be a picture of the user with whom user data 472-479 are associated. The image 471 can also be a clipart image, such as an avatar or other icon. In some implementations, the image 471 can be retrieved from electronic forums, blogs, bulletin boards, and instant messaging services with which the user is a member and whose profile contains an image that can be extracted for display in the detail interface 470.

As shown, the detail interface 470 can include a mobile number field 472 indicating the mobile number associated with the user, a home number field 473 indicating the home number associated with the user, a work number field 474 indicating the work number associated with the user. The detail interface 470 can also display an email field 475 indicating an email address associated with the user. A second email field 476 can also be presented where the user has more than one email address. The user also can define affiliated social network accounts using the detail interface 470. For example, the user can enter the username of the user for a particular social network in the first social network field 477. If the user has a second social network account, the user can also enter the username of the user for the second social network account in the second social network field 478.

In some implementations, the detail interface 470 can also present additional user profile data. For example, additional user profile data can include general demographic data about the user, such as, without limitation, age, sex, location, interests, and the like. In some implementations, the user profile data can also include professional information such as, without limitation, occupation, educational background, and other data, such as contact information. In some implementations, the user profile data can include open profile data (e.g., free-form text that is typed into text fields for various subjects such as "Job Description," "Favorite Foods," and the like) and constrained profile data (e.g., binary profile data selected by check boxes, radio buttons, or predefined selectable profile data, such as income ranges, zip codes, and the like). In some implementations, some or all or the user profile data can be classified as public or private profile data (e.g., data that can be shared publicly or data that can be selectively shared). Profile data not classified as private data can, for example, be classified as public data (e.g., data that can be viewed by any contact associated with the user).

In some implementations, the detail interface 470 can also display user acquaintances data that can, for example, define user acquaintances associated with the user on a particular network, function or service. For example, the detail interface 470 can include information associated with users or contacts that are classified as "friends," in a "friends" or "buddies" list. Other acquaintances can also be included in the detail interface 470 such as, without limitation, professional acquaintances, client acquaintances, family acquaintances, and the like. In some implementations, the user acquaintance data can be specified by the user or extracted from, for example, social networks or business entities with which the user is associated.

In some implementations, the detail interface 470 can display user groups to which the user is associated. For example, the detail interface 470 can display information indicating that the user is part of a "Wine" group or "Fishing" group of a particular social network.

As discussed previously, the mobile user can navigate between different interfaces for configuring one or more rules associated with inbound calls. In some implementations, a different set of interfaces can be presented for configuring one or more rules associated with outbound calls. In some implementations, these different set of interfaces can be displayed to the user upon invoking the outbound interface element 408 in the initial interface 400. FIG. 4J shows an example of an outbound interface 480 that can be presented to the user when the outbound interface element 408 is selected. Referring to FIG. 4J, the outbound interface 480 can be used to configure one or more setting parameters associated with outbound calls. As shown, the outbound interface 480 can include a caller ID field 482, a ringout field 484 and an international calling field 486 (e.g., through which a particular carrier or service can be selected for establishing international calls).

The caller ID field 482 allows the mobile number of the user from which outbound calls originate to be displayed on the devices of the called party. The ringout field 484 provides a ringout function where the mobile user using the virtual PBX services application can dial an outside telephone number (a number external to the PBX) via the virtual PBX application, and have the call on the called party's end appear to have originated from a different number of associated with the user.

In some implementations, when ringout field 484 is invoked by the mobile user, a dial pad can be presented to the mobile user. The user can enter a telephone number to be called by pressing the numbers on the dial pad, or by entering the numbers displayed on the mobile device. After the number is entered, the user can press a "Call" button on the display or the mobile device to call that number. The virtual PBX server can receive this call via one or more communications networks, proceed to call that number entered by the user, and subsequently connect the two calls while creating the appearance that the call originates from a different number associated with the user.

In some implementations, the selection of the ringout field 484 can invoke an address book application to be displayed on the mobile device. In some implementations, the user can enter a particular phone number to ringout directly from the address book after that particular phone number is selected. In some implementations, the ringout field 484 can also invoke a sub-panel through which the user can cancel the ringout attempt before the call is made.

FIGS. 5A-5D show an example of various interfaces that enable data associated with multiple communications platform to be displayed in a single universal platform. Specifically, the mobile user can interact and exchange cross-platform correlated data from other communications platforms using the exemplary interfaces shown in FIGS. 5A-5D. The universal platform allows the mobile user to cross technologies and use any desirable mode of access for interaction. For example, the universal platform allows the user to query data or make calls through PSTN, and can request to receive data response in text message format using SMS (Short Message Service) or MMS (multi-media message service).

In some implementations, interfaces shown in FIGS. 5A-5D can be presented to the user as an application available on the mobile device. For example, the application can be represented as an icon that can be selectable by the user of the mobile device. The icon representing the application can be invoked by a user input selecting it with a pointing device or touching it on the touch sensitive screen of the mobile device.

Referring to FIG. 5A, a message interface 502 can be presented to the user. In some implementations, the message interface 502 can communicate with one or more portals in real-time (or near real-time) for retrieving messages (or message-related data) associated with the user, and can be used to store and display various types of messages. For example, the message interface 502 can communicate with a voice portal, a SMS portal, a network portal, a fax portal or an email portal for retrieving voicemail messages, text messages, network messages, faxes and emails associated with the user. In some implementations, the message interface 502 can also communicate with other communications platforms and portals for downloading messages associated with the user.

With respect to voicemails, when a caller calls the mobile number of the user and the call was not answered, a voicemail can be left at the server of the virtual PBX services. In some implementations, the voicemails can be downloaded to the mobile device as sound files prior to the user invoking the voicemail on the message interface 502. In some implementations, the voicemails can be transmitted to the mobile device as the user is listening to the voicemail. In some implementations, the availability of voicemail messages (along with other types of message) can be shown in the message interface 502 as a list. Optionally, the voicemails can be shown with the callers' names or numbers, the date and time of the voicemail messages, and optionally, the duration of the voicemail messages. Optionally, the name of the caller can be displayed if the caller's number already exists in the user's address book or if the caller's name is available through other look-up services.

In addition to audio messages, the message interface 502 can also process text messages in a manner similar to voice messages. In some implementations, the message interface 502 allows cross-platform messages to be sent and received. For example, the message interface 502 can integrate voice message services with instant message services, email services and fax services so that cross-platform messages can be viewed in a single thread or history. As shown in FIG. 5A, the message interface 502 can display messages from various callers and senders that are sent using various types of communications protocols. Specifically, the message interface 502 can display an instant message 504, a fax message 505, a voice message 506 and network messages 507-508 (e.g., a post or comment to a blog or social network profile associated with the user). To aid the user in quickly identifying the importance of each message, the message interface 502 can provide a snapshot of each message to be displayed together with the corresponding message. For example, the message interface 502 can display the instant message 504 with a line of brief text summarizing the content of the instant message 504 (e.g., a line of text that reads "Dinner for dad's birthday will be at six . . . "). It is also possible to present the entire message via a ticker presentation where the text can be streamed across the screen. Additionally, the streaming can be synchronized with voicemail playback to enable users to read-along as the message is played. Furthermore, speech-to-text capability can also be provided for playing the messages. For example, voicemail messages can be converted into text format using, for example, commercialized software to provide automated transcription or human-assisted transcription. Similarly, text-to-speech capability can also be provided to convert a text message into audio format that can be played when the user checks the text message.

As another example, the message interface 502 can display data pertaining to the time at which the fax message was received (e.g., "4:54 pm") as well as the number of pages faxed to the user (e.g., "5 pages"). As yet another example, the message interface 502 can display an alert (e.g., "has a new profile picture") for the network message 508 alerting the user that a broadcast message has been received from a contact (e.g., from contact "Tony Lee") associated with the user via a particular social network and whose profile has been updated.

In some implementations, the message interface 502 allows the user to reply (e.g., using the "Reply" button 501b) to any of the messages 504-508 using any communications format (as will be discussed in greater detail below with respect to FIG. 5D). As an example, the message interface 502 (through the service manager 134) can send voice-to-text replies or messages to a particular contact. As yet another example, the message interface 502 can send text-to-voice replies or messages to another user's mobile phone.

In some implementations, the service manager 134 can transmit a particular type of messages or respond to a message with a particular format (e.g., instant messages) by logging into the user's associated account(s) (e.g., user's instant message account). Where personal authentication is needed, the authentication data can be received in advance from the user (e.g., at the time of activating the account) and store in the database 136. When needed, the authentication information can be retrieved in order to log onto the user's account. As an example, the service manager 134 can generate voice messages based on instant messages. In order to send an instant-to-voice message, the user can log onto an associated instant message client, select the designated recipient from a buddy list affiliated with the instant message account, compose the message, and send the message to the service manager 134 using the message interface 502. The service manager 134 then can receive the message, and based on the identity of the recipient, identify the phone number associated with the recipient. Using the identified phone number, the service manager 134 can convert the instant message into a voice message, and deliver the voice message to the recipient by placing a call to the recipient and playing the voice message when the call is picked up by the recipient.

In some implementations, the service manager 134 can first identify the source communication portal from which the message is received. Using the example described above, the service manager 134 can first determine that the message sent from the mobile device is received from an instant message communication network (e.g., an instant message sent from an AOL's AIM® account being accessed by the mobile device). Based on this determination, the service manager 134 also can determine the message to be an instant message. The service manager 134 can then process the instant message by converting (or modifying) the instant message into a voice message (e.g., without altering the message content) to be delivered to the recipient's mailbox or into a phone call to be placed to the recipient and played upon pickup.

In some implementations, prior to converting messages in one format into messages in another format, one or more conversion rules can be configured and defined in advance (e.g., by a user of a mobile user account provisioned with the virtual PBX services on the mobile device). The one or more conversion rules can include one or more delivery rules for managing the delivery of the one or more messages to corresponding recipients. Based on the one or more delivery rules, the one or more messages can be properly converted (e.g., without any user intervention or selection of a delivery method). As an example, if a delivery rule defines that voice messages received from the mobile device are to be delivered as instant messages, then the service manager 134 can, upon receiving voice messages from the mobile device, retrieve the delivery rule specifying the voice-to-instant message conversion, and subsequently convert the voice messages into instant messages prior to delivery. In general, the one or more delivery rules can specify how messages received in one format (e.g., as received from the mobile device) are to be delivered to corresponding recipients in another format. By specifying the one or more delivery rules during configuration (or account activation), the delivery process can automatically perform the delivery without the need to receive user selection of a specific delivery format every time a message is to be sent. For example, the service manager 134 can be configured, using the one or more delivery rules, to automatically process voice messages received from the mobile device into instant messages for delivery to corresponding recipients.

While the foregoing implementations are described for delivering messages from the mobile device, messages sent to the mobile device also can employ the same conversion or delivery rules. For example, one or more conversion or delivery rules can be specified that require incoming messages in one format (e.g., voice calls) to be delivered (e.g., by the service manager 134) to the mobile device in another format (e.g., email messages). In this example, the service manager 134 can, upon receiving the incoming messages, identify the communication formats of these incoming messages. Then, the service manager 134 can determine a delivery format corresponding to each of the identified communication formats (e.g., from the conversion or delivery rules previously specified by the user of the mobile device), and deliver each of the incoming message based on the determined delivery format. For example, the service manager 134 may receive an incoming social network message and an email message. Where an existing conversion or delivery rule specifies all incoming social network messages are to be delivered using instant messages and email messages are to be delivered using voice messages, the service manager 134 can automatically perform a social network-to-instant message conversion on the incoming social network message to be delivered to the recipient as an instant message, and an email-to-voice conversion on the incoming email message to be delivered as a voice call (or voice message) to the mobile device.

In some implementations, where the call delivery process requires accessing an external communication portal (e.g., requiring the service manager 134 to access the instant message account of a user associated with the mobile device to deliver a voice-to-instant message), the service manager 134 can display a prompt message on the mobile device to receive user authentication data for accessing the external communication portal. Alternatively, the service manager can retrieve the user authentication information from the user profile of the user associated with the mobile device that was created at the time of establishing the user account.

While the message interface 502 is described for displaying messages of different types (e.g., fax messages, email messages, voice messages and the like), the message interface 502 can also be adapted to display messages of a same type but different service providers. For example, the message interface 502 can be configured to display instant messages from various instant message providers such as, for example, MSN Messenger®, AOL's AIM®, Yahoo! Messenger® and Google's GTalk®. As another example, the message interface 502 can be configured to display social network messages associated with different social networks such as Facebook®, Twitter®, MySpace®, Linkedin®, Bebo®, Orkut® and the like.

In some implementations, the message interface 502 can also present a user interface element showing control options for reviewing the messages. For example, when a voicemail is selected, for example, by highlighting it in the list of voicemails, a "Play" button 509 can be displayed next to the message, and a visual indicator for the duration of the voice mail can also be shown. When the user selects to play the voicemail, the visual indicator can be updated to show the present location of the playback in the entire timeline 501c of the voicemail. Optionally, the user can rewind or fast forward to a desired location in the voicemail timeline by flicking or swiping across the visual indicator of the voicemail timeline in the backward or forward direction on the touch-sensitive display.

In some implementations, the visual indicator of the timeline can be implemented to show absolute time location in the timeline. For example, the length of the visual indicator can be directly correlated to the duration of the voicemail. A long voicemail can have a long visual indicator, and a short voicemail can have a short visual indicator. In some implementations, the visual indicator of a long message twice in duration as a short message can be twice as long as the visual indicator for the short message. In these implementations, the user can fast forward or rewind by a finger movement on the touch-sensitive display, and an absolute distance of the figure movement can determine the amount time fast forwarded or rewound. In some implementations, the visual indicator can show the relative time location in the timeline, and the speed or amount of fast forwarding and rewinding can depend on the magnitude or speed of the finger gesture on the touch sensitive display.

In some implementations, the voicemail control can include a button 501a for callback. The user can press on the callback button to return a call to the person who has left the voicemail. By calling back, all the functionalities associated with call handling rules such as, for example, the ringout feature can be available and employed.

In some implementations, the message interface 502 can include a button 501d for deleting one or more messages. In some implementations, the "Reply" button 501b can also function to forward a particular message to, for example, another email address, or another phone number, or save the message to a different storage location on the mobile device as a sound or text file.

In some implementations, the messages 504-508 can be sorted. For example, to initiate sorting, the user can select the button 511. Upon selecting the button 511, a drop down menu can be presented with one or more sorting methods that the user can select to effectuate the sorting process. In the example shown, the user can select to sort the messages based on the recency of the messages (e.g., new messages can be displayed at the top while old messages can be placed at the bottom), and the sorted names can be displayed (e.g., first-one-last or last-one-first) to the user in the message interface 502. The messages also can be sorted by using a combination of different methods such as, for example, numbers, alphabetical order, the most recent time the user was called, the most recent time the user made a call or sent a message, e-mail address, mobile phone number, home phone number, work phone number, facsimile number, home address and the like.

In some implementations, all messages can be displayed to the user by selecting the "All" button 513a. Alternatively, the user can restrict the display of messages based on a particular type or communication platform. For example, the user can restrict the display of messages to only those that originate from a specific social network (e.g., Facebook® by selecting button 513c). As another example, the user can restrict the display of messages to only instant messages that originate from a particular type and host (e.g., MSN's Communicator® by selecting button 513b).

FIG. 5B shows an example of a message detail interface 510 for displaying information associated with a message. Referring to FIG. 5B, the message detail interface 510 can display the substance of a corresponding message in field 512. In some implementations, the message detail interface 510 also can display additional information regarding the sender of the message such as personal information, which can include the name and phone number associated with the sender. Optionally, the message detail interface 510 can also display the ringtone that has been established for this particular sender so that incoming calls or messages from this sender can be distinctly identified.

In some implementations, the message detail interface 510 can facilitate the forwarding of the message to one or more contacts, callers, or recipients when the "Forward" button 515 is selected, or a reply to the sender when the "Reply" button 516 is selected. In some implementations, the user can view the entire message history associated with the sender when the "View History" button 514 is invoked. For example, invoking the "View History" button 514 allows a history interface to be presented for displaying all messages sent by the sender regardless of the communications platform.

Figure 5D:
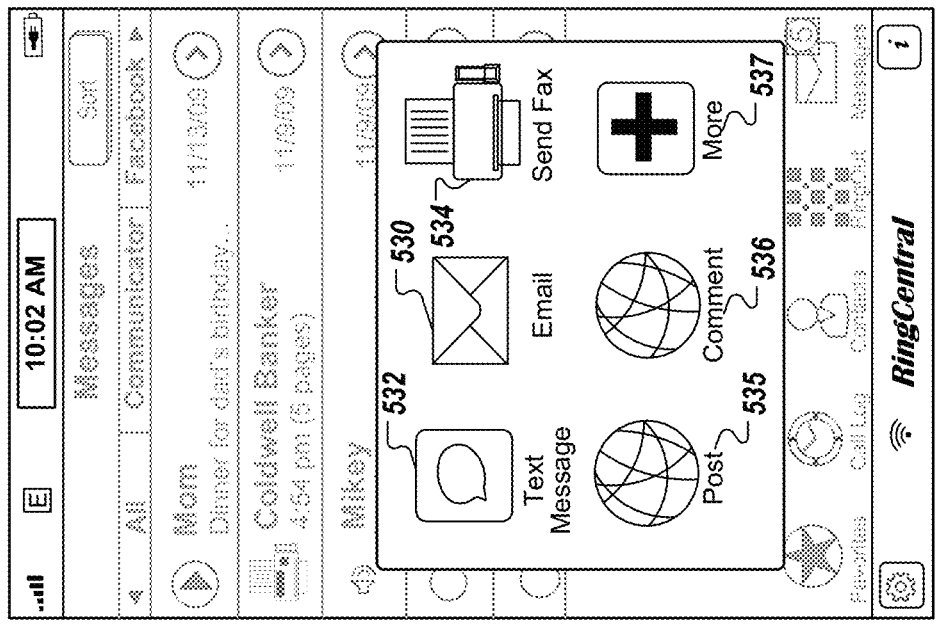
FIG. 5D shows an example of a display showing one or more communications platform options for replying to one or more messages.
Figure 5C:
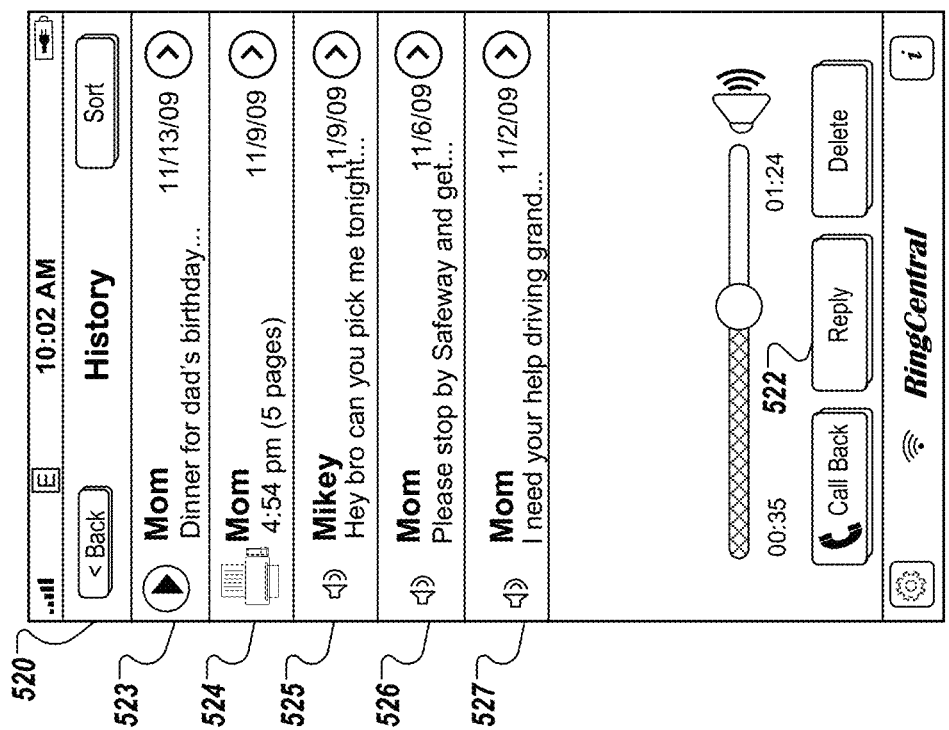
FIG. 5C shows an example of a history interface.

FIG. 5C shows an example of a history interface 520. As shown in FIG. 5C, the history interface 520 can display all messages sent by a particular sender in a single thread. The messages displayed in the history interface 520 can include messages of various types from various communications platforms. The history interface 520 can display a time and date for each message sent by the sender, and control elements (e.g., a "Play" button) to facilitate the presentation of the messages. Optionally, the history interface 520 can also display information such as the origin of the message (e.g., whether a particular message originates from a mobile phone or home phone), message type (e.g., whether the particular message is an instant message or voice message), message count (e.g., indicating the total number of messages sent by the sender) and the like. The messages displayed in the history interface 520 also can be sorted if desired.

FIG. 5D shows an example of a display 530 showing one or more communications platform options for replying to one or more messages. In some implementations, the display 530 can be invoked when the user replies (e.g., using the "Reply" button 522) to any of the messages 523-527. After the user has selected to reply to a message (e.g., by highlighting the message to be replied and selecting the "Reply" button 522), the display 530 can be presented to the user. In some implementations, the display 530 can display one or more communications platform services that can be used to reply to the message. In the example shown, the display 530 can provide multiple communications platform services through which a message can be responded; namely, text message service 532, email service 533, fax service 534, post service 535, and comment service 536. Additional communications platform services also can be accessed by selecting the icon 537. The user can respond to any of the existing messages via any of the communications platform services displayed in the display 530. As an example, the user can receive an instant message from a friend, and reply to the instant message using SMS text messaging. As another example, the user can send voice-to-text replies or messages to a particular contact. As yet another example, the user can send email-to-fax replies or messages to another user's fax machine.

Figure 6B:
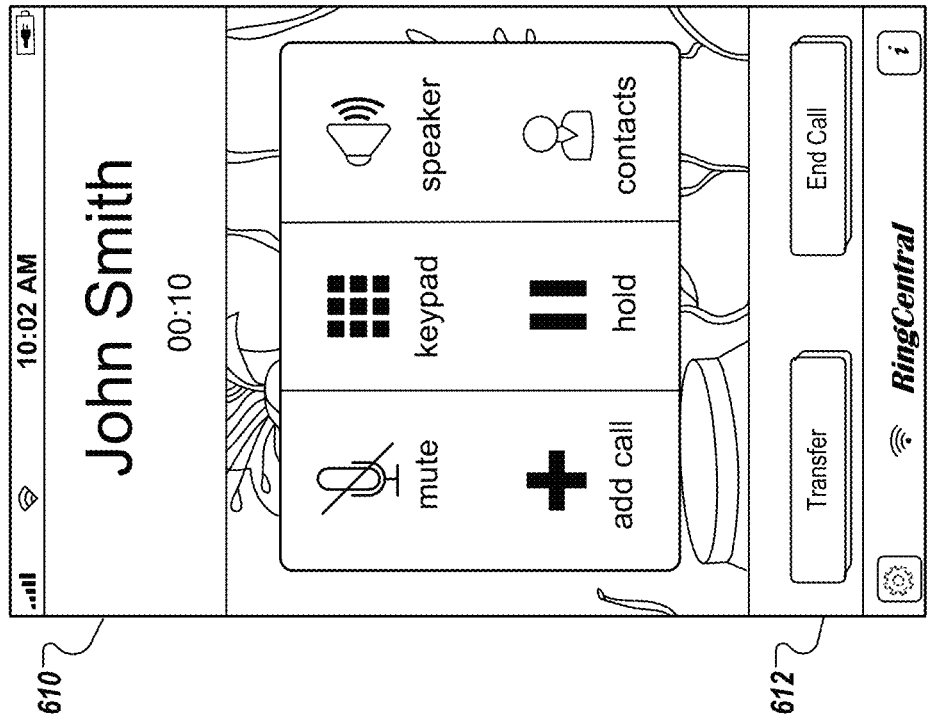
FIG. 6B shows an example of an on-screen transfer option.
Figure 6A:
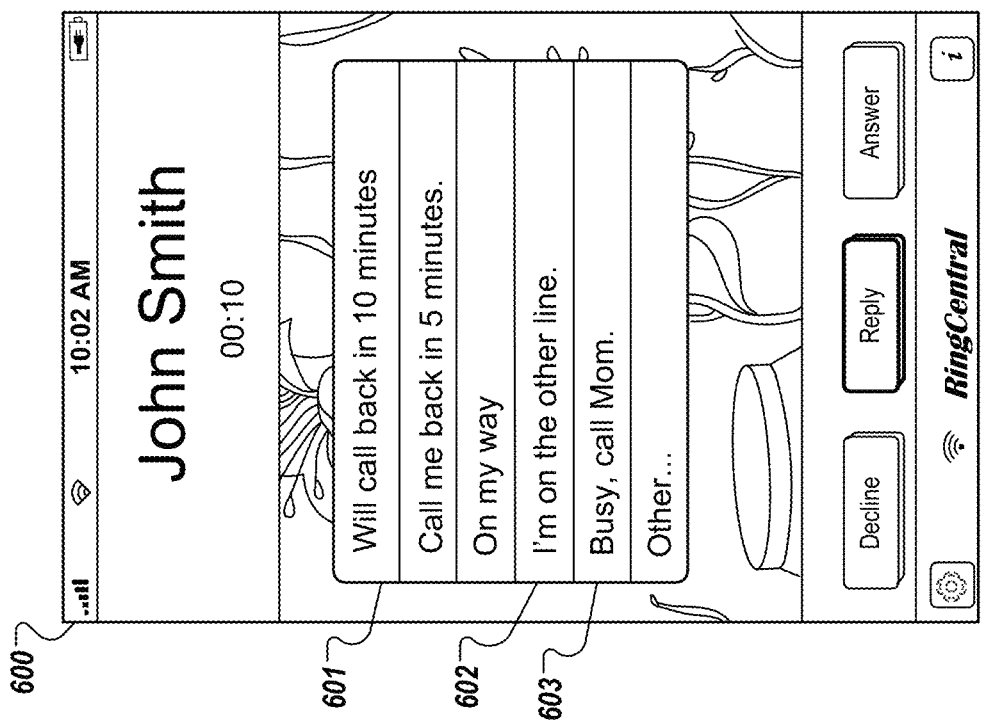
FIG. 6A shows an example of a live call interface.

FIG. 6A shows an example of a live call interface 600 that enables the user to selectively respond to calls without having to answer the call directly. As shown in FIG. 6A, the live call interface 600 allows the user to reply to an incoming call with a text-to-speech prompt that can be played to the caller while the caller is waiting for the call to be picked up by the user. In the example shown, the live call interface 600 provides multiple predefined prompts that can be selected for immediate execution. For example, the user can select option 601 to automatically play a computer-generated prompt to alert the caller that the user will call the caller in ten minutes. As another example, the user can select option 602 to automatically play a computer-generated prompt to notify the caller that the user is on another line. As yet another option, the user can create a custom prompt by defining a text description that can be converted into speech upon playing the selected option. For example, the user can customize an option tailored for a specific contact (e.g., option 603 can be customized to read "Busy, call mom"). It should be noted that the options shown are merely exemplary and non-limiting, and other options are also contemplated.

If the user has decided to pick up the call, the user can be presented with an on-screen option to transfer the call. FIG. 6B shows an example of an on-screen transfer option. Referring to FIG. 6B, the interface 620 can include an on-screen transfer option 612 that allows the user to transfer a live call to another extension or phone line through an onscreen option (e.g., rather than using traditional Dual Tone Multi-Frequency (DTMF) or touch tones). The user can perform the transfer function by selecting the on-screen transfer option 612. In some implementations, upon selecting the on-screen transfer option 612, the interface 620 can present a list (or a table or drop down menu) that includes one or more available extensions and/or phone numbers to which an ongoing call can be transferred. When an extension or phone number has been selected, the interface 620 can immediately execute the request and immediately transfer the call to the selected destination.

Figure 7:
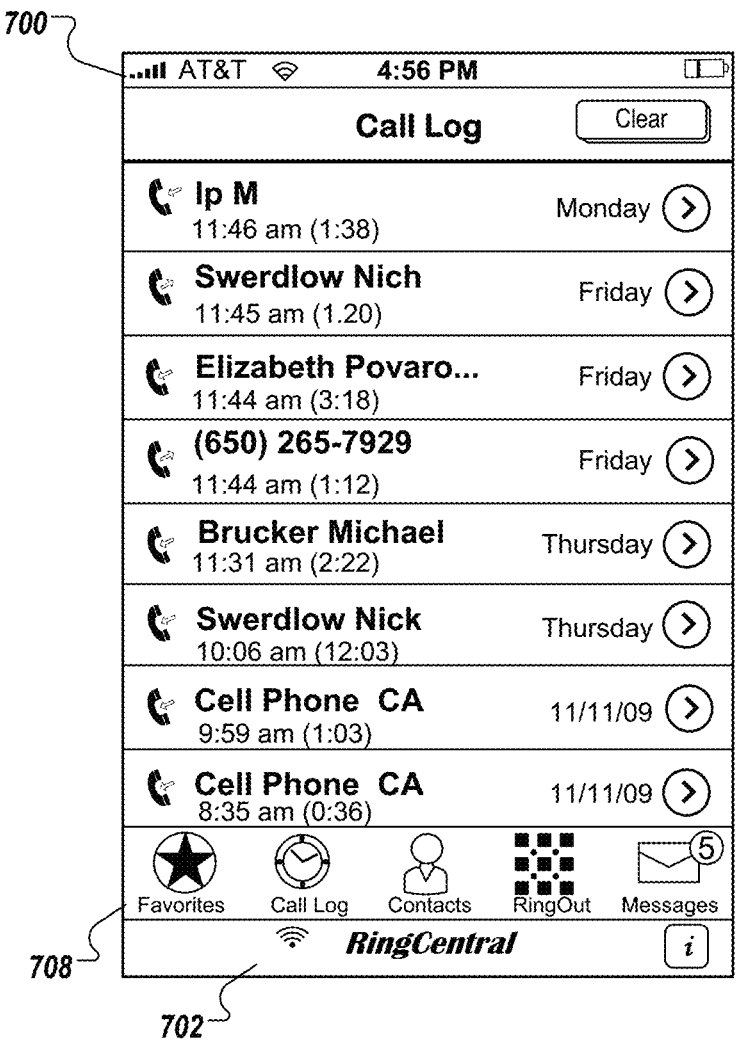
FIG. 7 shows a call log interface.

FIG. 7 shows a call log interface 700 through which calls sent and received call be recorded in a log. In some implementations, the call log interface 700 can be displayed upon invoking the call log interface element 702 in a panel 708 that contains one or more call-related options.

In some implementations, the call log interface 700 can receive call log data from a private telecommunication network, a public telecommunication network and/or a mobile telecommunication terminal, and merge the received call logs into a single thread that contains call logs of the user receiving or calling from/to the private telecommunication network, the public telecommunication network and/or the mobile telecommunication terminal.

To improve and provide user-friendliness, each of the entries displayed in the call log interface 700 can be displayed according to specific criteria. For example, call entries can be arranged according to date and time of the call, and can be displayed in distinct graphical representation indicating their call log source (e.g., call log entries originating from the call log of a private telecommunication network can be presented in red color while call log entries originating from a public telecommunication network can be presented in black color). Distinct graphical representation also can be used to indicate whether the call entry is associated with a transmitted call (e.g., to a called party) or a received call (e.g., from an outside caller). Furthermore, other information on the entries can be mirrored by specific types, fonts, icons or other visuals (e.g., missed and un-answered calls can be set in bold face while incoming and outgoing calls can indicated by arrows to the right and the left, respectively).

In some implementations, in addition to call entries, the call log interface 700 also can display outgoing or incoming messages sent or received by the user (e.g., sent and received instant messages, sent and received faxes, sent and received comments to social networks). In so doing, the call log interface 700 can maintain a comprehensive call log that allows the user to determine if and when a particular call or message is sent or received without querying multiple sources for these information.

FIG. 8A shows an example of a contact interface 800 that can be used to display contacts associated with the user. As shown in FIG. 8A, the contact interface 800 can be invoked upon selecting the contacts interface element 802. In some implementations, the contact interface 800 can display contacts from one or more platforms. For example, the contact interface 800 can display contacts retrieved from the user's social network(s), instant messaging buddy list(s), email account(s) and the like. In general, the contact interface 800 can display a combined list of all contacts from all accounts the user has provisioned. In some implementations, when all contacts are viewed, the contact interface 800 can intelligently detect contacts or individuals that are available on or possess capability to multiple platforms (e.g., either manually defined by the user when editing a contact's profile, or from information gathered from the user's social networks in which the contact is also part of), and present an aggregated contact entry or display multiple entries for the same contact or individual based on the respective platform.

In some implementations, the contacts displayed in the contact interface 800 can be filtered into one or more contact groups. To filter the contacts displayed in the contact interface 800, the "Groups" button can be selected to invoke a contact group interface for configuring each contact into one or more contact groups. FIG. 8B shows an example of a contact group interface 810 displaying one or more contact groups for filtering one or more contacts. Referring to FIG. 8B, the contact group interface 810 can include one or more contact groups 812, 814 and 816. In some implementations, each contact group can be defined based on the type of a communications platform. For example, contact group 812 can be associated with a social network platform, while contact group 814 can be associated with an exchange platform and contact group 816 can be associated with an email platform. In some implementations, each of the contact groups 812-816 also can include one or more sub-groups 818a-818c that can be used to further classify a contact. For example, business-related contacts can be classified and displayed using the business subgroup 818b, and personal contacts can be classified and displayed using the personal subgroup 818a. In some implementations, contacts displayed in the contact interface 800 can be automatically classified and grouped based on user/contact profile information associated with each contact, and classified group of contacts can be accessed using the contact groups 812-816. For example, if the contact "John Doe" has previously communicated with the user through an exchange network and the user has identified the contact "John Doe" as a personal contact (e.g., from the address book), then the contact "John Doe" can be classified and group under the personal subgroup 818b. To add additional contact group, the user can activate the "+" button 819. Once a contact group is created, the user can associate the contact group with a user identification. For example, for the "Social Network" contact group 812, the user's email address can be associated with the "Social Network" contact group 812 indicating that contacts within the "Social Network" contact group 812 can communicate with the user using the user's email address. A different user email address also can be associated with a different contact group through which users in that group can communicate with the user. For example, business and personal contacts within the "Exchange" contact group 814 can communicate with the user using an email address different from that used by the contacts associated with the "Social Network" contact group 812.

Figure 8C:
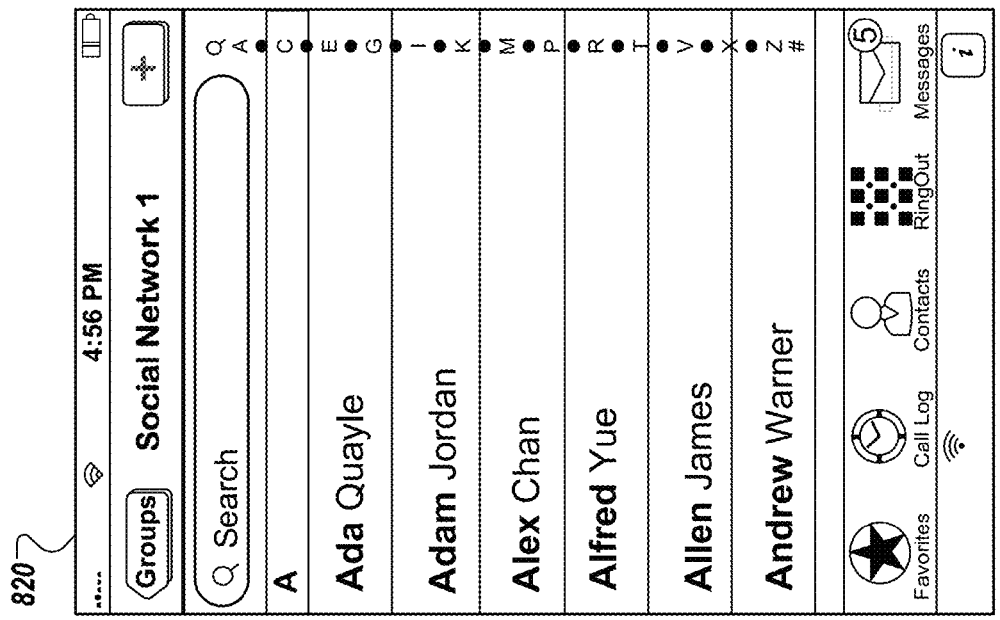
FIG. 8C shows an example of a categorized group interface.

FIG. 8C shows an example of a categorized group interface 820. The categorized group interface 820 can be presented to the user, for example, by selecting the user field 813 containing the user's email address under the "Social Network" contact group 812. In general, the categorized group interface 820 can be used to display a filtered or subset of a specific group. In the example shown, the categorized group interface 820 can display contacts associated with the user's social network.

In some implementations, the user can communicate with each contact defined in the categorized group interface 820 using different communications platforms to effectuate services including, without limitation, call forwarding, call routing, facsimile, email, text messaging, voice messaging (e.g., voice mail), extension support, private branch exchange, and the like.

Figure 9:
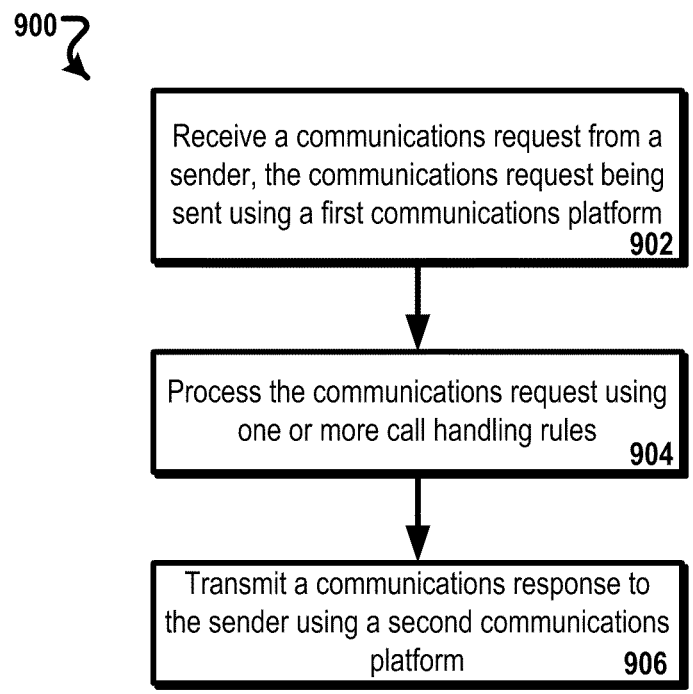
FIG. 9 shows an example process for enabling integration between various communications platforms.

FIG. 9 shows an example process for enabling integration between various communications platforms. Referring to FIG. 9, process 900 begins with receiving a communications request from a sender (902). The communications request can be sent using a first communications platform. In some implementations, the communications request can be a call. In other implementations, the communications request can be a message. The communications request can be processed using one or more call handling rules (904). A communications response can be transmitted to the sender using a second communications platform (906).

Operations 902-906 can be performed in the order listed, or in parallel (e.g., by the same or a different process, substantially or otherwise non-serially).

Computer Devices

Figure 10:
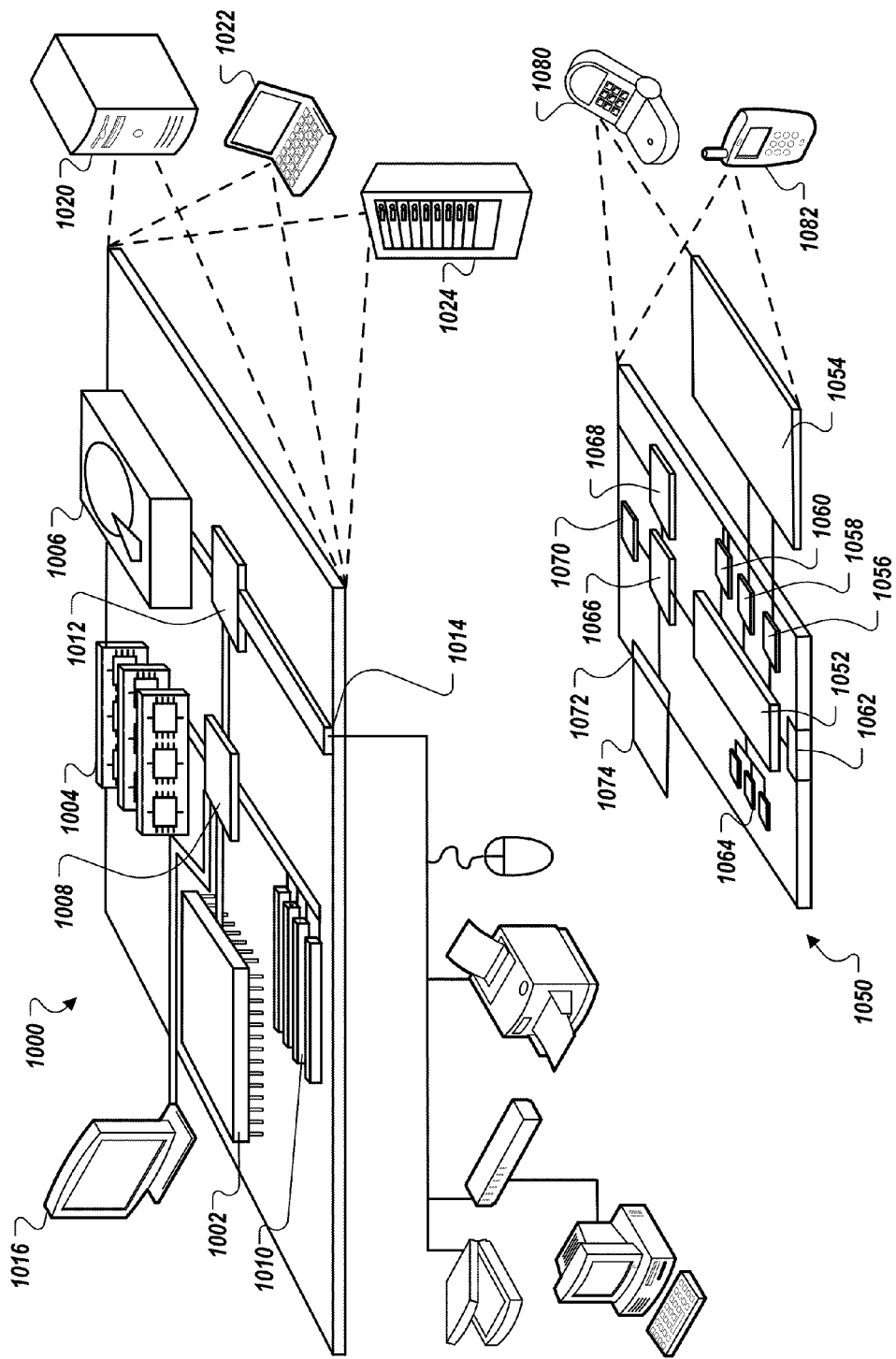
FIG. 10 is a block diagram of two computing devices that can be used to implement processes and methods described in relation to the call management system shown in FIG. 1.

FIG. 10 is a block diagram of computing devices 1000, 1050 that may be used to implement the systems and methods described in this document, as either a calling device or receiving device. Computing device 1000 can represent various forms of digital computers, such as laptops, desktops, workstations, personal digital assistants, servers, blade servers, mainframes, and other appropriate computers (e.g., user terminal 126). Computing device 1050 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit implementations of the inventions described and/or claimed in this document.

As shown in FIG. 10, computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multiprocessor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD display or an OLED display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication (e.g., via a docking procedure) or for wireless communication (e.g., via Bluetooth or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to device 1050 through expansion interface 1072, which may include, for example, a SIMM card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS receiver module 1270 may provide additional wireless data to device 1050, which may be used as appropriate by applications running on device 1050.

Device 1050 may also communication audibly using audio codec 1060, which may receive spoken information from a user and convert it to usable digital information. Audio codex 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A method comprising:

receiving, by a first provider, a user communication from a mobile device, the user communication being sent by a sender and intended for a recipient, the user communication sent using a source communication portal in a source format, delivery of communications sent using the source communication portal handled by the first provider, and the mobile device associated with one or more device management rules for managing communications originated from or destined to the mobile device using one or more communications portals;

retrieving, by the first provider, a device management rule associated with managing delivery of the user communication, the device management rule identifying a destination format in which the user communication is to be delivered to the recipient, wherein the destination format is different from the source format;

determining that accessing an external communication portal associated with a second provider different from the first provider is necessary for the first provider to: (i) convert the received user communication from the source format to the destination format and (ii) deliver the received user communication to the recipient in the destination format, wherein the external communication portal is a communication portal that is used to send communications in the destination format and wherein the destination format is not handled by the first provider;

in response to determining that accessing the external communication portal is necessary to convert and deliver the received user communication, delivering, by the first provider, the received user communication to the recipient based on the source format and the destination format including:

identifying a user account of the sender of the user communication with the external communication portal;

obtaining authentication data for the user account of the sender of the user communication with the external communication portal from the mobile device;

accessing the external communication portal, wherein the accessing comprises accessing the user account of the sender of the user communication with the external communication portal using the obtained authentication data for the user account; and delivering the received user communication in the different destination format using the external communication portal.

2. The method of claim 1, wherein obtaining the authentication data comprises receiving the authentication data from the mobile device.

3. The method of claim 1, wherein processing the received communication includes, after accessing the external communication portal, converting the source format of the received communication to the destination format using the external communication portal.

4. The method of claim 3, wherein converting the source format includes modifying the source format into the destination format without altering content of the received user communication.

5. The method of claim 3, wherein the source communication portal is one of a voice communication portal or instant message communication portal; and
where the source format is one of a voice message or instant message.

6. The method of claim 5, wherein processing the received communication includes converting the voice message or instant message into the destination format prior to delivery.

7. The method of claim 1, further comprising:
displaying a threaded interface on the mobile device, the threaded interface tracking communications sent to and received from the recipient in a single conversation history.

8. The method of claim 7, wherein tracking the communications includes presenting communications previously sent to and received from the recipient through various communication portals in the threaded interface.

9. The method of claim 7, wherein tracking the communications includes presenting messages selected from a group comprising social network messages, voice messages, instant messages, email messages previously sent to and received from the recipient in the threaded interface.

10. The method of claim 1, further comprising:
receiving communication log data from a plurality of communications portals; and
displaying the received communication log data as a single thread in a log interface on the mobile device, the received communication log data containing call information associated with calls made from and to the mobile device.

11. The method of claim 10, further comprising updating the log in real time as outgoing or incoming communications are sent to or received from the mobile device through the plurality of communications portals.

12. The method of claim 1, further comprising:
receiving contact information associated with a plurality of contacts having sent to or received from the mobile device one or more communications through one or more communication portals;
identifying, from the contact information, one or more contacts who have previously sent or received one or more messages to or from the mobile device using more than one communication portal;
aggregating the one or more messages sent to or received from the mobile using more than one communication portal into a single entry; and
displaying the single entry on the mobile device.

13. A method comprising:
receiving, by a first provider, a user request from a mobile device to configure a mobile user account pre-provisioned with one or more virtual private branch exchange (PBX) services including receiving user configuration data for configuring the one or more virtual PBX services;
configuring, by the first provider, the one or more virtual PBX services based on the received user configuration data including configuring one or more conversion rules for converting communications originated from or destined to the mobile device into different formats;
receiving a communication in a first format from the mobile device, wherein the communication is intended for a recipient, wherein delivery of communications in the first format is handled by the first provider;
determining, from the conversion rules, that the mobile device is to be delivered to the recipient in a second, different format;
determining that accessing an external communication portal associated with a second provider different from the first provider is necessary for the first provider to: (i) convert the received user communication from the source format to the destination format and (ii) deliver the received user communication to the recipient in the destination format, wherein the external communication portal is a communication portal that is used to send communications in the destination format and wherein the destination format is not handled by the first provider;
in response to determining that accessing the external communication portal is necessary to convert and deliver the received user communication, delivering, by the first provider, the received user communication to the recipient based on the source format and the destination format including:
identifying a user account of the sender of the user communication with the external communication portal;
obtaining authentication data for the user account of the sender of the user communication with the external communication portal from the mobile device;
accessing the external communication portal, wherein the accessing comprises accessing the user account of the sender of the user communication with the external communication portal using the obtained authentication data for the user account; and
delivering the received user communication in the different destination format using the external communication portal.

14. The method of claim 13, wherein configuring the one or more conversion rules includes specifying one or more delivery rules for delivering the one or more communications to corresponding recipients.

15. The method of claim 14, wherein converting the communication from the first format to the second format is performed based on a delivery rule associated with the received communication.

16. The method of claim 14, wherein specifying the one or more delivery rules includes specifying how communications received in the first format are to be delivered to the corresponding recipients in the second format.

17. The method of claim 13, wherein configuring the one or more conversion rules includes specifying one or more receiving rules for converting one or more communications from the recipient to a predetermined format before delivering the one or more communications from the recipient to the mobile device.

18. The method of claim 13, wherein receiving the communication includes receiving the communication in response to a recipient communication from the recipient delivered to the mobile device.

19. The method of claim 13, wherein receiving the communication in the first format includes receiving an instant message from the mobile device; and
where converting the communication includes converting the instant message to a voice message.

20. A system comprising:
a data processing apparatus; and
a memory in data communication with the data processing apparatus and storing instructions executable by the data processing apparatus and upon such execution cause the data processing apparatus to perform operations comprising:
receiving, by a first provider, a user communication from a mobile device, the user communication intended for a recipient, the user communication sent using a source communication format in a source format, delivery of communications sent using the source communication portal handled by the first provider, and the mobile device associated with one or more device management rules for managing communications sent to or received from the mobile device using one or more communications portals;
retrieving, by the first provider, a device management rule associated with managing delivery of the user communication, the device management rule identifying a destination format in which the user communication is to be delivered to the recipient, wherein the destination format is different from the source format;
determining that accessing an external communication portal associated with a second provider different from the first provider is necessary for the first provider to: (i) convert the received user communication from the source format to the destination format and (ii) deliver the received user communication to the recipient in the destination format, wherein the external communication portal is a communication portal that is used to send communications in the destination format and wherein the destination format is not handled by the first provider;
in response to determining that accessing the external communication portal is necessary to convert and deliver the received user communication, delivering, by the first provider, the received user communication to the recipient based on the source format and the destination format including:
identifying a user account of the sender of the user communication with the external communication portal;
obtaining authentication data for the user account of the sender of the user communication with the external communication portal from the mobile device;
accessing the external communication portal, wherein the accessing comprises accessing the user account of the sender of the user communication with the external communication portal using the obtained authentication data for the user account; and
delivering the received user communication in the different destination format using the external communication portal.

21. A system comprising:
a data processing apparatus; and
a memory in data communication with the data processing apparatus and storing instructions executable by the data processing apparatus and upon such execution cause the data processing apparatus to perform operations comprising:
receiving, by a first provider, a user request from a mobile device to configure a mobile user account pre-provisioned with one or more virtual private branch exchange (PBX) services including receiving user configuration data for configuring the one or more virtual PBX services;
configuring, by the first provider, the one or more virtual PBX services based on the received user configuration data including configuring one or more conversion rules for converting communications to different formats;
receiving a communication in a first format from the mobile device, wherein the communication is intended for a recipient, wherein delivery of communications in the first format is handled by the first provider;
determining, from the conversion rules, that the mobile device is to be delivered to the recipient in a second, different format;
determining that accessing an external communication portal associated with a second provider different from the first provider is necessary for the first provider to: (i) convert the received user communication from the source format to the destination format and (ii) deliver the received user communication to the recipient in the destination format, wherein the external communication portal is a communication portal that is used to send communications in the destination format and wherein the destination format is not handled by the first provider;
in response to determining that accessing the external communication portal is necessary to convert and deliver the received user communication, delivering, by the first provider, the received user communication to the recipient based on the source format and the destination format including:
identifying a user account of the sender of the user communication with the external communication portal;
obtaining authentication data for the user account of the sender of the user communication with the external communication portal from the mobile device;
accessing the external communication portal, wherein the accessing comprises accessing the user account of the sender of the user communication with the external communication portal using the obtained authentication data for the user account; and
delivering the received user communication in the different destination format using the external communication portal.

22. The method of claim 1, wherein delivering the received user communication through the external communication portal is performed in a manner such that the received user communication is received as if originated from the external communication portal.

23. The method of claim 1, wherein the user communication identifies the recipient by an identifier of a user account of the recipient with the source communication format, and wherein delivering the received user communication further comprises:
identifying, from the identifier of the user account of the recipient with the source communication format, a user account of the recipient with the external communication portal; and delivering the received user communication in the destination format from the user account of the sender with the external communication portal to the user account of the recipient associated with the external communication portal using the external communication portal.

* * * * *